(12) United States Patent
Goden

(10) Patent No.: US 7,057,600 B2
(45) Date of Patent: Jun. 6, 2006

(54) ELECTROPHORETIC DISPLAY METHOD AND DEVICE

(75) Inventor: Tatsuhito Goden, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 10/337,884

(22) Filed: Jan. 8, 2003

(65) Prior Publication Data

US 2003/0095094 A1 May 22, 2003

Related U.S. Application Data

(62) Division of application No. 09/832,210, filed on Apr. 11, 2001, now Pat. No. 6,738,039.

(30) Foreign Application Priority Data

| Apr. 13, 2000 | (JP) | ............................. 112115/2000 |
| Mar. 14, 2001 | (JP) | ............................. 72663/2001 |

(51) Int. Cl.
*G09G 3/34* (2006.01)
(52) U.S. Cl. ...................................... 345/107; 359/296
(58) Field of Classification Search ................ 345/107; 359/296, 240, 241, 242
See application file for complete search history.

(56) References Cited

U.S. PATENT DOCUMENTS

| 3,612,758 A | 10/1971 | Evans et al. ............... 178/5.4 R |
| 4,045,327 A | 8/1977 | Noma et al. ................. 359/237 |
| 4,203,106 A | 5/1980 | Dalisa et al. ............... 340/787 |
| 4,522,472 A | 6/1985 | Liebert et al. .............. 359/296 |
| 5,345,251 A | 9/1994 | DiSanto et al. ............. 345/107 |
| 6,239,896 B1 | 5/2001 | Ikeda ......................... 359/240 |
| 6,473,072 B1 | 10/2002 | Comiskey et al. .......... 345/173 |
| 2004/0227985 A1* | 11/2004 | Kishi et al. ................. 359/296 |

FOREIGN PATENT DOCUMENTS

| JP | 49-5598 | 1/1974 |
| JP | 54-85699 | 7/1979 |
| JP | 55-154198 | 12/1980 |
| JP | 57-82086 | 5/1982 |
| JP | 362099727 | * 5/1987 |
| JP | 401086117 | * 3/1989 |
| JP | 8-507154 | 7/1996 |
| JP | 9-185087 | 7/1997 |
| JP | 11-202804 | 7/1999 |

* cited by examiner

*Primary Examiner*—Dennis-Doon Chow
(74) *Attorney, Agent, or Firm*—Fitzpatrick, Cella, Harper & Scinto

(57) ABSTRACT

An electrophoretic display device includes a first substrate, first and second driving electrodes arranged on the first substrate, a second substrate arranged in an opposing relation to the first substrate and a third driving electrode arranged on the second substrate. A transparent dielectric liquid is filled between the first substrate and the second substrate, and a plurality of migratory particles are dispersed in the transparent dielectric liquid. A barrier is disposed on a surface of the third driving electrode arranged on the second substrate and is situated in an opposing relation to a boundary between the first driving electrode and the second driving electrode.

22 Claims, 25 Drawing Sheets

SELECTED LINE

WHITE VIEW | BLACK VIEW

NON-SELECTED LINE

WHITE VIEW MAINTAINED STATE | BLACK VIEW MAINTAINED STATE

SELECTED LINE

WHITE VIEW | BLACK VIEW

NON-SELECTED LINE

WHITE VIEW
MAINTAINED STATE

BLACK VIEW
MAINTAINED STATE

Ta

Tb

Tc

INITIAL RESET (TOTAL ERASURE)

SELECTED SCAN-SIGNAL
ELECTRODE LINE

DATA SIGNAL ON

DATA SIGNAL OFF

NON-SELECTED SCAN-SIGNAL
ELECTRODE LINE

DATA SIGNAL ON

DATA SIGNAL OFF

ELECTROPHORETIC DISPLAY METHOD AND DEVICE

This is a divisional application of application Ser. No. 09/832,210, filed on Apr. 11, 2001 now U.S. Pat. No. 6,738,039.

BACKGROUND OF THE INVENTION

1. Field of the Invention

The present invention relates to an electrophoretic display method and device in which charged migratory particles are migrated for display of an image.

2. Description of the Related Art

Recently, with rapid development of information equipment, the amount of data included in various kinds of information has increased more and more, and output of the information has been made in various forms. Generally, information is outputted in two primary ways, i.e., display-screen representation using a CRT or a liquid crystal, and hard-copy representation on paper using a printer or the like. In the display-screen representation, increasing needs exist for a display device that has low power consumption and is thin. Above all, a liquid crystal display has been actively developed and commercialized as a display device adaptable for such needs.

However, a current liquid crystal display has problems, which are not yet overcome to a satisfactory level, in that characters displayed on a screen become hard to perceive depending on the angle of viewing the screen and the presence of reflected light, and a burden is imposed on a viewer's visual organ due to, e.g., flickering and low luminance of a light source. Also, the display-screen representation using a CRT can provide the contrast and luminance at a satisfactory high level as compared with the case of using a liquid crystal display, but it accompanies flickering, etc. and hence also cannot be regarded as having a sufficient display quality as compared with the hard-copy representation described below. Additionally, the display-screen representation using a CRT entails a large and heavy body, and is therefore very poor in portability.

Meanwhile, at the beginning of the electronization era, it was thought that the hard-copy representation would no longer be required with the progress of electronization of information. In practice, however, a great deal of information is still outputted in the form of hard copies. The reasons are as follows. When information is displayed using a display unit, there occurs not only the above-mentioned problems with regard to display quality, but also another problem that a resolution achieved by the display-screen representation is generally about 120 dpi at maximum, which is fairly lower than that in the case of printing out information on paper (usually not lower than 300 dpi). Accordingly, the display-screen representation imposes a greater burden on a viewer's visual organ than the hard-copy representation. As a result, although information can be confirmed on a display screen, the information is often outputted in the form of hard copies. Another major reason why the hard-copy representation is utilized in spite of a capability of displaying information on a display screen, is that, unlike the display-screen representation, hard copies of information can be arranged side by side in large number without being restricted by a display size defining a display area, and they can be rearranged or checked in order with no need of complicated device operations. Furthermore, the hard-copy representation requires no energy for holding information in a represented state, and has superior portability enabling information to be read or checked in any place and at any time unless the amount of information is extremely large.

Thus, the hard-copy representation has various merits over the display-screen representation so long as moving images or frequent rewriting is not needed, but it is disadvantageous in consuming a great deal of paper. In recent years, therefore, a rewritable recording medium (i.e., a recording medium that enables an image to be displayed in many recording and erasing cycles with high viewability, but does not require energy for holding the image in a displayed state) has been actively developed. Such a third rewritable display system taking over superior characteristics of hard copies is herein called a paper-like display.

Requirements of the paper-like display are, for example, that it is rewritable, requires no or a sufficiently small amount of energy for holding an image in a displayed state (memory character), has superior portability, and has a high display quality. At present, one example of a display system, which can be regarded as the paper-like display, is a reversible display medium employing an organic low-molecular and high-molecular resin matrix and being able to record or erase an image by a thermal printer head (e.g., see Japanese Patent Laid-Open Nos. 55-154198 and 57-82086). Such a matrix is employed in display portions of some prepaid cards, but still has problems that the contrast is not so high and the number of times at which an image can be recorded and erased repeatedly is relatively small, i.e., on the order of 150 to 500.

As another display system capable of being utilized as the paper-like display, there is known an electrophoretic display device (U.S. Pat. No. 3,612,758) invented by Harold D. Lees, et al. Also, Japanese Patent Laid-Open No. 9-185087 discloses an electrophoretic display device. Such a display device comprises a disperse system wherein charged migratory particles are dispersed in a dielectric liquid, and a pair of electrodes is arranged in an opposing relation with the disperse system situated between the electrodes. By applying a voltage to the disperse system through the electrodes, charged migratory particles are attracted under electrostatic forces to the side of the electrode having a polarity opposite to that of charges of the migratory particles themselves based on the electrophoresis of charged particles. Display of information is performed by coloring the migratory particles and utilizing a difference between the color of the migratory particles and the color of the dyed dielectric liquid. More specifically, when the migratory particles are attracted onto the surface of a first electrode that is closer to the viewer and is light transparent, the color of the migratory particles is observed. On the contrary, when the migratory particles are attracted onto the surface of a second electrode that is farther away from the viewer, the color of the dielectric liquid, which is dyed so as to have different optical characteristics from those of the migratory particles, is observed.

In the above-described electrophoretic display device, however, a dye and a coloring material in the form of ions, for example, must be mixed in the dielectric liquid, and the presence of such a coloring material tends to act as an unstable factor in the electrophoretic operation because of giving rise to a new transfer of charges. This tendency may deteriorate the performance, useful life and stability of the display device.

To overcome the above problem, Japanese Patent Laid-open Nos. 49-5598 and 11-202804 propose a display device wherein a pair of electrodes, i.e., first and second driving electrodes, are arranged on the same substrate and migratory particles are migrated horizontally as viewed from the viewer. By applying voltages to the first and second driving electrodes, the migratory particles in a transparent dielectric liquid are horizontally migrated parallel to the substrate surface between the first and second driving electrodes based on the electrophoresis of charged particles, whereby an image is displayed.

In such an electrophoretic display device of the horizontally migrating type, the dielectric liquid is transparent and the first and second driving electrodes have different colors as viewed from the viewer side such that the color of one electrode coincides with the color of the migratory particles. Assuming, for example, that the color of the first driving electrode is black, the color of the second driving electrode is white, and the color of the migratory particles is black. The second driving electrode is exposed to provide a white view when the migratory particles are distributed over the first driving electrode, and the black color of the migratory particles is viewed when the migratory particles are distributed over the second driving electrode.

A display device comprising a large number of pixels arranged in a matrix pattern is electrically addressed in two primary ways, i.e., an active matrix mode and a passive matrix mode.

In the active matrix mode, a switching element such as a thin film transistor (TFT) is formed corresponding to each pixel, and voltages applied to the pixels are controlled in an independent manner for each pixel. By using the active matrix mode, the electrophoretic display device of the horizontally migrating type can be operated with a high display contrast. However, the active matrix mode has problems that the process cost is relatively high and it is difficult to form thin film transistors on a polymer substrate because of a high process temperature required in formation of the thin film transistors. These problems are particularly critical to manufacture of a paper-like display that is intended to be low in cost and flexible. A process for forming thin film transistors with a polymer material, which is adaptable for printing, is proposed to overcome those problems, but it is still an unknown quantity in practical applicability.

In the passive matrix mode, since only X-Y electrode lines are required as components necessary for addressing, the cost is relatively low and the electrodes lines can be easily formed on a polymer substrate. When applying a write voltage to a selected pixel, a voltage corresponding to the write voltage is applied to the X- and Y-electrode lines that cross each other at a point defining the selected pixel. In general, however, where an electrophoretic display device is operated by the passive matrix mode, there occurs so-called crosstalk, i.e., a phenomenon that the write voltage is applied to not only the selected pixel but also other pixels around it, whereby the display contrast is noticeably deteriorated. This is a problem that takes place inevitably because the electrophoretic display device does not have a definite threshold characteristic with respect to the write voltage.

To cope with the above-mentioned problem, it has been proposed to realize the passive matrix addressing in an electrophoretic display device, which does not have a threshold in principle, by employing a three-electrode structure wherein a control electrode is provided in addition to a pair of display electrodes. Most proposals regarding the three-electrode structure are related to electrophoretic display devices of the type using vertically arranged electrodes, as disclosed in, by way of example, Japanese Patent Laid-Open No. 54-085699 (corresponding to U.S. Pat. No. 4,203,106).

For a three-electrode structure in the electrophoretic display device of the horizontally migrating type, only one proposal is disclosed in Japanese Patent Publication No. (by PCT application) 8-507154 (corresponding to U.S. Pat. No. 5,345,251). However, a disperse solution used in Japanese Patent Publication No. (by PCT application) 8-507154 seems to be not transparent, but colored. This related art therefore differs in category from the electrophoretic display devices of the horizontally migrating type, which are featured by using a transparent disperse solution, as disclosed in the above-cited Japanese Patent Laid-Open Nos. 49-5598 and 11-202804 and as intended by the present invention.

Japanese Patent Publication No. (by PCT application) 8-507154 discloses two types of constructions (FIGS. 17A and 17B of the attached drawings). In the first construction (FIG. 17A), a control electrode 14 is arranged as a third electrode on the side of a second substrate 2 in an electrophoretic display device of the horizontally migrating type. In the second construction (FIG. 17B), a control electrode 14 is arranged as a third electrode between a first driving electrode 3 and a second driving electrode 4 both arranged on the side of a first substrate 1.

In any type of the first and second constructions, the first driving electrode 3 in the forked form as an assembly of a plurality of line electrodes and the second driving electrode 4 in the forked form as an assembly of a plurality of line electrodes, which are laid between adjacent lines of the first driving electrode 3, are both arranged on the first substrate 1 within an area of each pixel. The second driving electrode 4 is arranged on a step 15 formed by a thick chrome film. Accordingly, a level difference 22 of about 0.3 μm is formed at the boundary between the first driving electrode 3 and the second driving electrode 4. In the first construction, the control electrode 14 is formed on the underside of the second substrate 2 over the entire surface of each pixel area, the second substrate 2 being arranged in an opposing relation to the first substrate 1 with a spacing of 25 μm to 116 μm left between both the electrodes. In the second construction, the control electrode 14 is arranged on the first substrate 1 between respective lines of the first driving electrode 3 and the second driving electrode 4. In FIGS. 17A and 17B, for the sake of explanation, the first driving electrode 3 and the second driving electrode 4 are each illustrated as being constituted by one line.

The write operation of the electrophoretic display device disclosed in Japanese Patent Publication No. (by PCT application) 8-507154 will be described with reference to FIGS. 18 and 19. FIG. 18 shows migratory particles in respective operational conditions, and FIG. 19 shows applied pulses and a change of reflectance. The cell construction is the same as that shown in FIG. 17A (except for only one pixel being shown in FIG. 18).

Note that values of applied voltages mentioned in the following description are ones obtained under conditions of an experiment actually conducted by the inventors, and the conditions of the experiment are not exactly coincident with those described in Japanese Patent Publication No. (by PCT application) 8-507154. Such a discrepancy in those conditions primarily depends on differences in physical properties such as the polarity and amount of charges on migratory particles used. Hereunder, the values of applied voltages, which were obtained as results of the experiment made on the migratory particles used by the inventors, are employed for easier comparison with the operation of the present invention described later.

Also, although it seems that a colored liquid is used as a dielectric solution in Japanese Patent Publication No. (by PCT application) 8-507154, a transparent dielectric liquid is used in the following description for easier comparison with the operation of the present invention described later. Furthermore, for a method of developing display contrast, the following description is made as using a similar method to that employed in embodiments of the present invention wherein the color of the migratory particles is black, the color of the first driving electrode is black, and the color of the second driving electrode is white.

It is supposed that the migratory particles 6 are positively charged, the first driving electrode 3 serves as a common electrode, and a driving voltage Vd and a control voltage Vc are applied respectively to the first driving electrode 3 and the control electrode 14 with the ground potential of the second driving electrode 4 being as a reference.

In FIG. 8, a time period Ta represents a state where a white view is maintained. Also, arrows schematically indicate vectors of an electric field produced in a cell. The migratory particles 6 collected over the first driving electrode 3 are restrained from moving toward the side of the second driving electrode 4 due to the presence of the level difference 22 between the first driving electrode 3 and the second driving electrode 4. At the same time, the migratory particles 6 are held down to be urged toward the first substrate side under the control voltage Vc=+250 V applied between the first driving electrode 3 and the control electrode 14. During this time period Ta, therefore, the migratory particles 6 are stabilized in a condition as shown and a white view state with a reflectance R of about 70% is maintained. The driving voltage Vd=+5 V applied to the first driving electrode 3 in a state, in which a current view is maintained, serves to suppress a tendency of the migratory particles 6 near the level difference 22 to migrate toward the side of the first driving electrode 3 in the black view maintained state.

In a write period Tb, the driving voltage Vd=+50 V and the control voltage Vc=+50 V are applied. Since the first driving electrode 3 and the control electrode 14 are set to the same potential, the migratory particles 6 are released from being held down under the control voltage, whereby all of the migratory particles 6 are horizontally migrated toward the side of the second driving electrode 4 along the driving electrode surfaces beyond the level difference 22. As a result, the reflectance R abruptly decreases.

In a time period Tc representing a state in which a black view is maintained, the migratory particles 6 are held down to be urged toward the first substrate side as shown under the control voltage Vc=+250 V. Accordingly, a black view state with a reflectance R of about 5% is maintained.

The passive matrix addressing method disclosed in Japanese Patent Publication No. (by PCT application) 8- 507154 will be described below with reference to FIGS. 20 and 21. Let us assume an electrophoretic display device of the horizontally migrating type has an (m×n) matrix wherein m columns of pixels are arrayed in the X-direction and n rows of pixels are arrayed in the Y-direction. Corresponding to the array configuration of pixels, a number m of data-signal electrode lines connected to the control electrodes 14 are arranged in the column direction, and a number n of scan-signal electrode lines connected to the first driving electrodes 3 are arranged in the row direction, with both the lines crossing each other in an orthogonal relation. The second driving electrode 4 is fixedly maintained at the ground potential so as to serve as a common electrode.

First, Vd=−50 V is applied to all of the scan-signal electrode lines and Vc=0 V is applied to all of the data-signal electrode lines so that all of the migratory particles 6 are collected over the first driving electrode 3 (FIG. 20A, total erasure). Then, the scan-signal electrode lines are selected one by one in sequence from the top in the Y-direction for writing. In a selection period (write period), Vd=+50 V is applied to the scan-signal electrode lines, Vc=+50 V is applied to those ones of the data-signal electrode lines corresponding to selected pixels, and Vc=+250 V is applied to the other ones of the data-signal electrode lines corresponding to non-selected pixels. For the selected pixels, the migratory particles 6 are migrated to the side of the second driving electrode 4 beyond the level difference under the driving voltage Vd=+50 V applied between the first and second driving electrode 3, 4, whereby writing is performed (FIG. 20B). For the non-selected pixels, the driving voltage Vd=+50 V is also applied to the first driving electrode 3. In the first construction, however, the migratory particles 6 are held down to be urged onto the first driving electrode 3 under the control voltage Vc=+250 V and are prevented from migrating (to perform writing) (FIG. 20C).

On the other hand, in a non-selection period, Vd=+5 V is applied to the scan-signal electrode lines, and Vc=+50 V or +250 V is applied to the data-signal electrode lines (FIGS. 21A to 21D). In any case, the migratory particles 6 are held down to be urged onto the surface of the first substrate as shown under the control voltage.

Thus, writing of information is performed by the passive matrix addressing method in the electrophoretic display device of the horizontally migrating type that does not have a threshold characteristic.

However, the following problems are experienced with the electrophoretic display device of the horizontally migrating type disclosed in Japanese Patent Publication No. (by PCT application) 8-507154.

The disclosed first construction has a limitation that the level difference 22 defined by the step 15 cannot be set to a large value. If the level difference is too large, part of the charged migratory particles 6 could not move over the level difference and would remain on the lower one of two surfaces defining the level difference when forced to migrate in the selection period, thus resulting in a reduced display contrast (FIG. 22A). To avoid the migratory particles 6 from remaining on the lower surface, the height of the step 15 must be limited to a value approximately equal to the diameter of the migratory particles 6.

Due to such a limitation imposed on the height of the step 15, the level difference cannot provide the effect of suppressing the migration of the migratory particles 6 at a sufficient level. Accordingly, when applying the control voltage Vc to hold down the migration of the migratory particles 6 for the non-selected pixel (FIG. 20C) in a condition where the driving voltage Vd is applied in the selection period, part of the migratory particles 6 moves over the level difference because of the step 15 being low. This phenomenon gives rise to a serious problem that crosstalk occurs and the display contrast deteriorates (FIG. 22B).

If the control voltage Vc is set to a sufficiently high value, the undesired migration of the migratory particles 6 can be prevented to a nearly satisfactory extent. However, this solution not only has the disadvantage of increasing the applied voltage, but also brings about another problem that charges injected into dielectric components of the device under a high voltage remain there even after release of the high voltage, and the operational condition of the migratory particles 6 becomes unstable due to an unintended electric field caused by the remaining charges.

The limitation imposed on the height of the step 15 raises still another problem as follows. Since the height of the step 15 is not sufficient, the area difference between the first driving electrode 3 and the second driving electrode 4 cannot be set to a large value. If the area difference is set to a large value, the migratory particles 6 would flow over onto the electrode surface having a larger area even when the migratory particles 6 are urged such that they are all collected on the electrode surface having a smaller area (FIG. 22C). Consequently, the display contrast is restricted because it is determined by an area ratio between the first driving electrode 3 and the second driving electrode 4.

Further, in the disclosed first construction (FIG. 17A), the effect of suppressing the migration of the migratory particles 6, provided by the level difference, is restricted only in the direction toward the higher surface side from the lower surface side, whereas the migration of the migratory particles 6 from the higher surface side to the lower surface side is rather accelerated. The write direction is therefore limited to only one direction from a white to black view. In other words, the addressing method for writing is restricted to the steps of first collecting the migratory particles 6 for an overall screen to the lower surface side for total reset, and then writing information by migrating the migratory particles 6 in one direction to the higher surface side. It is hence impossible to perform bi-directional writing, i.e., black-to-white and white-to-black writing, and to realize such an operation as selectively rewriting only part of an image on the screen.

The disclosed second construction (FIG. 17B) operates in the selection period such that a high voltage is applied to the control electrode 14 for the non-selected pixel to prevent the migratory particles 6 from moving in both directions, and the voltage of the control electrode 14 is set to 0 V for the selected pixel, allowing the migratory particles 6 to smoothly migrate in either direction. In this case, therefore, the step 15 is considered to not be an essential component.

In the disclosed second construction, however, the control electrode 14 is able to control the migration of the migratory particles 6 only between the first and second driving electrodes, and is unable to control the migration of the migratory particles 6 within each of the driving electrode surfaces. Due to a control voltage applied to the control electrode 14 in the non-selection period, therefore, the migratory particles 6 having been evenly dispersed over the driving electrode surface are repellently migrated in a direction away from the control electrode 14 and are partially distributed within the driving electrode surface as shown in FIG. 23A or 23B. This invites a problem of noticeably reducing the display contrast.

SUMMARY OF THE INVENTION

With the view of overcoming the problems set forth above, it is an object of the present invention to provide a novel electrophoretic display method and device, which have the following features.

According to one aspect of the present invention, in an electrophoretic display method for use in an electrophoretic display device comprising a first substrate, first and second driving electrodes arranged on the first substrate, a second substrate arranged in an opposing relation to the first substrate, a third driving electrode arranged on the second substrate, a transparent dielectric liquid filled between the first substrate and the second substrate, and a plurality of migratory particles dispersed in the transparent dielectric liquid. The method comprises, for display of information, a first step of migrating the migratory particles between the first driving electrode and the second driving electrode; and a second step of migrating the migratory particles between the first driving electrode or the second driving electrode and the third driving electrode.

Preferably, the electrophoretic display method further comprises a step of applying voltages to the first driving electrode, the second driving electrode and the third driving electrode to provide a time period in which a relationship of potentials of the first driving electrode and the second driving electrode being higher than a potential of the third driving electrode is satisfied for positively charged migratory particles, or a time period in which a relationship of potentials of the first driving electrode and the second driving electrode being lower than a potential of the third driving electrode is satisfied for negatively charged migratory particles. The migratory particles are attracted onto the third driving electrode arranged on the second substrate.

Preferably, the electrophoretic display method further comprises a step of rewriting display through a first stage of moving the migratory particles, which are attracted onto the third driving electrode, away from the third driving electrode, a second stage of migrating the migratory particles between the first driving electrode and the second driving electrode, and a third stage of attracting the migratory particles onto the third driving electrode.

Preferably, the electrophoretic display method further comprises a step of applying voltages to the first driving electrode, the second driving electrode and the third driving electrode to provide a time period in which a relationship of potentials of the first driving electrode and the second driving electrode being lower than a potential of the third driving electrode is satisfied for positively charged migratory particles, or a time period in which a relationship of potentials of the first driving electrode and the second driving electrode being higher than a potential of the third driving electrode is satisfied for negatively charged migratory particles. The migratory particles are moved away from the third driving electrode arranged on the second substrate.

As an alternative, preferably, the electrophoretic display method further comprises a step of rewriting display through a first stage of moving the migratory particles, which are attracted onto the third driving electrode, away from the third driving electrode, and simultaneously migrating the migratory particles onto the first driving electrode or the second driving electrode, and a second stage of attracting the migratory particles to the second substrate side.

According to another aspect of the present invention, an electrophoretic display device comprises a first substrate; first and second driving electrodes arranged on the first substrate; a second substrate arranged in an opposing relation to the first substrate; a third driving electrode arranged on the second substrate; and a transparent dielectric liquid filled between the first substrate and the second substrate. A plurality of migratory particles are dispersed in the transparent dielectric liquid, and a barrier is disposed on a surface of the third driving electrode arranged on the second substrate, with the barrier being situated in an opposing relation to a boundary between the first driving electrode and the second driving electrode.

According to still another aspect of the present invention, an electrophoretic display device comprises a first substrate; first and second driving electrodes arranged on the first substrate; a second substrate arranged in an opposing relation to the first substrate; a third driving electrode arranged on the second substrate; and a transparent dielectric liquid filled between the first substrate and the second substrate. A plurality of migratory particles are dispersed in the transparent dielectric liquid, and a charged film disposed on a surface of the third driving electrode is arranged on the second substrate, with the charged film having surface charges which are constantly electrified with a polarity opposite to that of the charged migratory particles.

Preferably, the electrophoretic display device further comprises insulating layers arranged to cover the first driving electrode, the second driving electrode, and the third driving electrode.

Preferably, at least one of the first driving electrode, the second driving electrode, the third driving electrode, the first substrate, the second substrate, and the insulating layers is colored in a color having different optical characteristics from those of the migratory particles.

Preferably, the first substrate and the second substrate are each formed of a polymer film.

Preferably, an average diameter of the migratory particles is in the range of 0.1 µm to 10 µm.

Preferably, the distance between the first substrate and the second substrate is not larger than 500 µm.

Preferably, the distance between the first substrate and the second substrate is not larger than 100 µm.

Preferably, the distance between the first substrate and the second substrate is not smaller than the diameter of the migratory particles.

Preferably, the distance between the first substrate and the second substrate is not smaller than twice the diameter of the migratory particles.

Preferably, the distance between the first substrate and the second substrate is not smaller than five times the diameter of the migratory particles.

Preferably, the first substrate and the migratory particles are black or deep black in color.

With the electrophoretic display method and device set forth above, the voltage required to inhibit the migration of the migratory particles and hold them at a standstill can be reduced to a large extent in comparison with that required in a conventional electrophoretic display device disclosed in the above-cited Japanese Patent Publication No. (by PCT application) 8-507154, for example, when operated with a conventional passive matrix addressing method.

The present invention proposes a novel passive matrix addressing method based on a transfer display technique in which a pseudo threshold is provided by transferring a display pattern onto the third driving electrode arranged on the second substrate. In other words, the passive matrix addressing method of the present invention differs basically from the conventional passive matrix addressing method in which a control electrode is employed to apply a high control voltage for holding down the migratory particles and inhibiting the migration of them, as disclosed in the above-cited Japanese Patent Publication No. (by PCT application) 8-507154.

More specifically, in accordance with the novel method of the present invention, the passive matrix addressing method can be realized by migrating the migratory particles between the first driving electrode and the second driving electrode to form a display pattern, and then attracting the migratory particles onto the third driving electrode arranged on the second substrate, whereby the display pattern is transferred onto the second substrate side.

The reason why the novel passive matrix addressing method can be realized is based on two phenomena. First, since the migratory particles are drawn under a driving voltage applied to the third driving electrode and are attracted onto the third driving electrode, the migratory particles become hard to horizontally migrate under electric fields produced by voltages applied to the first and second driving electrodes. Secondly, on the side of the second substrate that is disposed in an opposing relation to the first and second driving electrodes with a certain distance left between them, the electric fields produced by the voltages applied to the first and second driving electrodes are weakened. Therefore, even when the voltages applied to the first and second driving electrodes are changed, the migratory particles avoid being affected by resulting changes of the electric fields.

Because the above two phenomena act effectively on the migratory particles, a high voltage is not required to be applied to the third driving electrode. Further, in a state where the display pattern is transferred onto the third driving electrode, even when the voltages applied to the first and second driving electrodes are changed, the migratory particles maintain the previous condition and the display pattern formed before the voltage changes remains the same. Consequently, the present invention has a very valuable advantage that, in spite of the migratory particles not having a definite threshold characteristic with respect to the driving voltage, it is possible to inhibit the migration of the migratory particles and hold them at a standstill even under a relatively low voltage, whereby an electrophoretic display device can be operated with a passive matrix addressing method in a satisfactory manner.

Further objects, features and advantages of the present invention will become apparent from the following description of the preferred embodiments with reference to the attached drawings.

BRIEF DESCRIPTION OF THE DRAWINGS

FIGS. 6A to 6H are explanatory views showing part of one passive matrix addressing method for the display device of the present invention;

FIGS. 8A to 8F are explanatory views showing part of another passive matrix addressing method for the display device of the present invention;

FIGS. 23A and 22B are schematic views for explaining a problem with the other conventional display device;

DESCRIPTION OF THE PREFERRED EMBODIMENTS

Preferred embodiments will be described below with reference to the drawings.

(Basic Construction and Operation)

Figure 1:
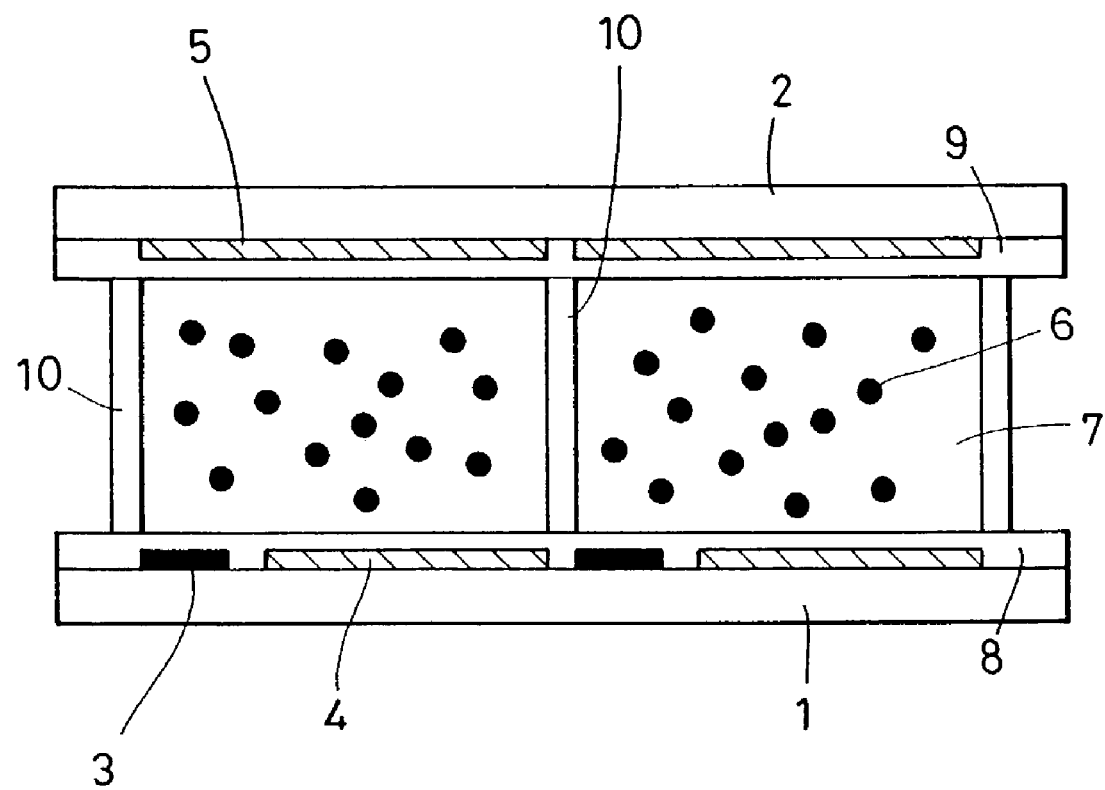
FIG. 1 is a sectional view of one typical example of a display device of the present invention.

FIG. 1 is a sectional view showing one typical example of a construction of a display device of the present invention. For the sake of explanation, FIG. 1 illustrates the construction comprising two pixels. A first substrate 1 and a second substrate 2 are arranged in an opposing relation with partitions 10 provided between both substrates. A first driving electrode 3 and a second driving electrode 4 are formed on an upper surface of the first substrate 1, whereas a third driving electrode 5 is formed on a lower surface of the second substrate 2. A transparent dielectric liquid 7 is filled in the space defined by both the substrates 1, 2 and the partitions 10, and charged migratory particles 6 are dispersed in the dielectric liquid 7.

Figure 2A:
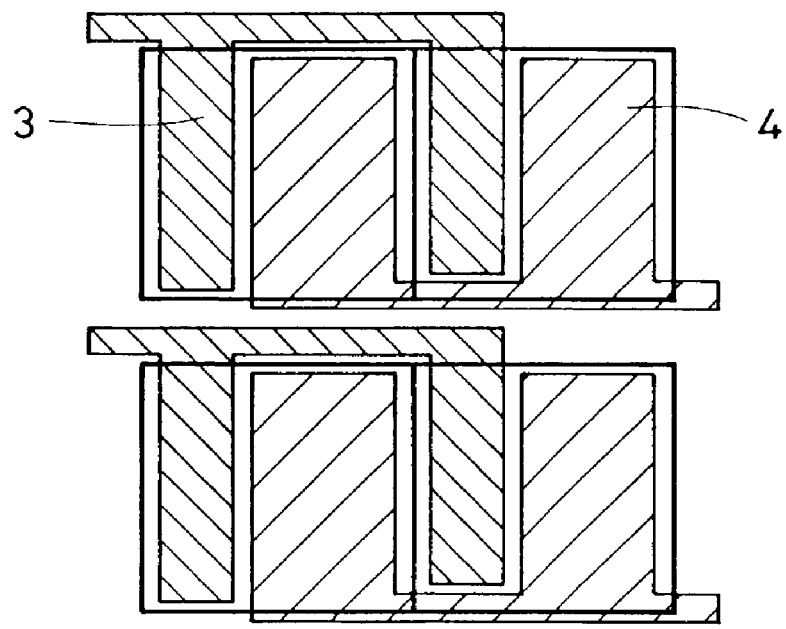
FIGS. 2A and 2B are each a plan view of one typical example of the display device of the present invention.
Figure 2B:
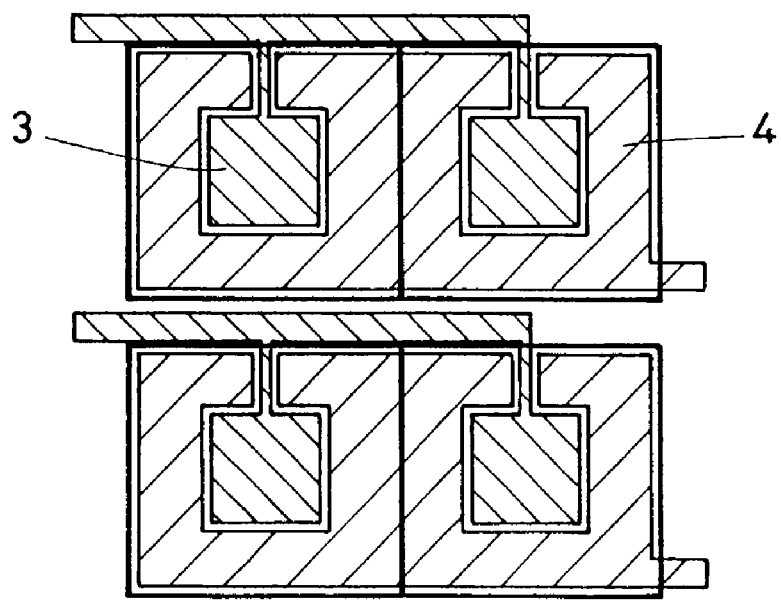

Plan shapes of the first driving electrode 3 and the second driving electrode 4 are not limited to particular ones. One typical example is a striped electrode (shown in FIG. 2A). In addition, each electrode may have any suitable shape such as being rectangular (FIG. 2B) or in the form of a circular or other closed loop.

Practical sizes of the construction shown in FIG. 1 are preferably set, by way of example, such that for a pixel size of 100 μm×100 μm, the average diameter of the migratory particles 6 is 1 μm, the spacing between the first and second substrates 1, 2 is 80 μm, and an area ratio with respect to the total pixel area is 15% for the first driving electrode 3 and 85% for the second driving electrode 4.

Figure 3A:
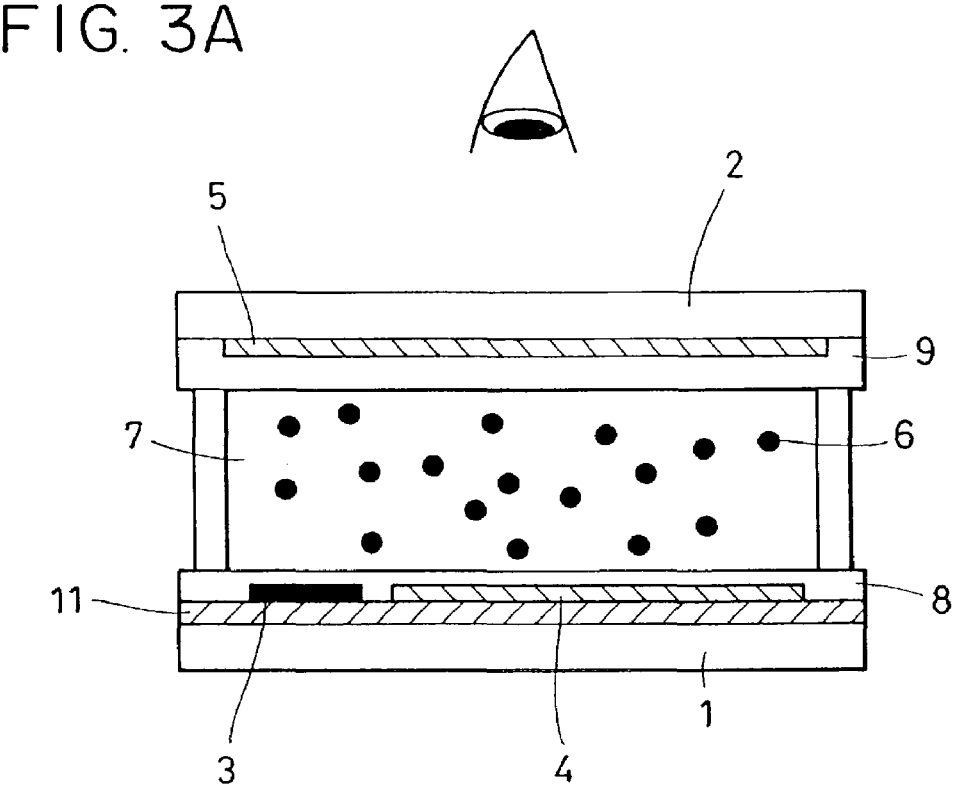
FIGS. 3A and 3B are each a sectional view of another typical example of the display device of the present invention.

Cell components of the display device can be colored in any desired combination. For example, the color of the migratory particles 6 is black, the second substrate 2 is transparent, the color of the first driving electrode 3 is black, the color of the second driving electrode 4 is white, and the third driving electrode 5 is transparent. This combination provides monochrome display in which a white view and a black view can be selectively switched over when the viewer looks at the cell from the second substrate side. Color display is also possible by coloring and arranging the second driving electrodes 4 so as to provide red, green and blue pixels, or by forming the second driving electrode 4 to be transparent and coloring the first substrate 1 so as to provide red, green and blue pixels, or forming the second driving electrode 4 to be transparent and providing an insulating layer 11 colored so as to provide red, green and blue pixels on the first substrate 1, as shown in FIG. 3A.

Figure 3B:
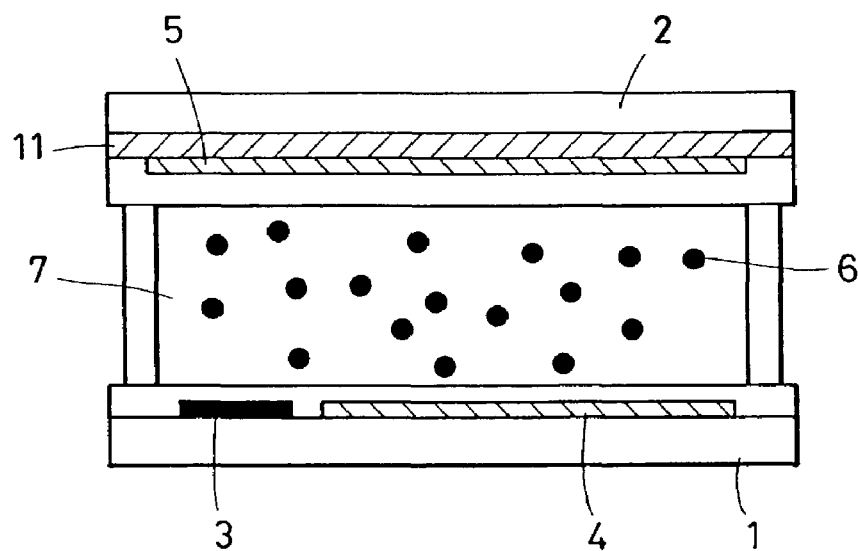

The viewer is not always required to look at the cell from the second substrate side. When the viewer looks at the cell from the first substrate side, a white view and a black view can be selectively switched over to provide monochrome display by employing a combination that the color of the migratory particles 6 is black, the first substrate 1 is transparent, the color of the first driving electrode 3 is black, the second driving electrode 4 is transparent, and the color of the third driving electrode 5 is white. Also, in this case, color display is possible by coloring and arranging the third driving electrodes 5 so as to provide red, green and blue pixels, or by forming the third driving electrode 5 to be transparent and coloring the second substrate 2 so as to provide red, green and blue pixels, or forming the second driving electrode 4 to be transparent and providing an insulating layer 11 colored so as to provide red, green and blue pixels on the underside of the second substrate 2, as shown in FIG. 3B.

Significant features of the addressing method used in the present invention will now be described with reference to FIGS. 4 and 5. FIGS. 4 and 5 show operational conditions of the migratory particles in successive steps of the addressing method. The following description is made on the premise that the migratory particles 6 are positively charged, and the components are colored such that the migratory particles 6 are black, the first driving electrode 3 is black, the second driving electrode 4 is white, and the third driving electrode 5 is transparent. Arrows in FIGS. 4 and 5 schematically indicate vectors of an electric field produced in the cell. The cell construction is the same as that shown in FIG. 1. Further, it is assumed that a driving voltage Vd1 is applied to the first driving electrode 3, a driving voltage Vd2 is applied to the second driving electrode 4, and a driving voltage Vd3 is applied to the third driving electrode 5. Additionally, it is to be noted that voltage values indicated in the following description do not represent ones which must be always employed in practice, and can be set as desired so long as the display method of the present invention is realized.

Figure 4A:
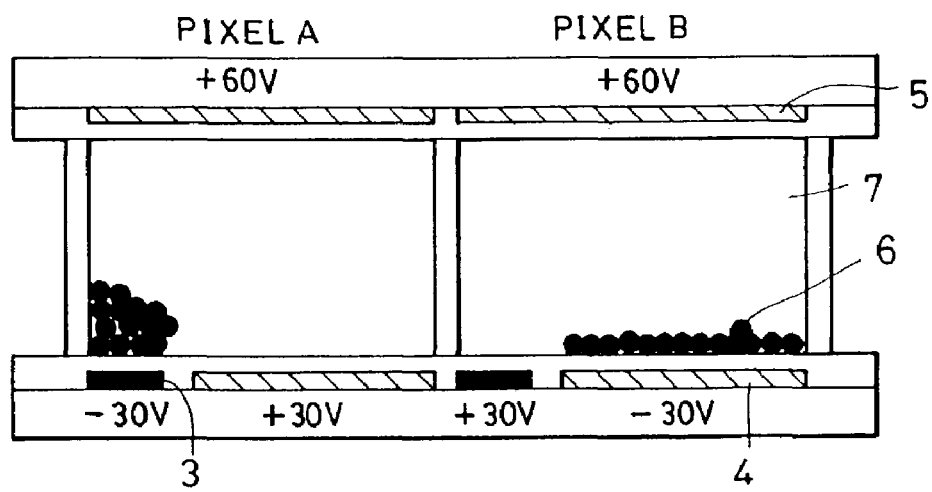
FIGS. 4A, 4B and 4C are explanatory views showing part of an addressing method and operational conditions in the display device of the present invention.

First, the driving voltages are applied to the first driving electrode 3 and the second driving electrode 4 so that the migratory particles 6 are horizontally migrated (FIG. 4A). More specifically, for a pixel A, the driving voltage Vd1=−30 V is applied to the first driving electrode 3 and the driving voltage Vd2=+30 V is applied to the second driving electrode 4, thereby providing a white view state. For a pixel B, the driving voltage Vd1=+30 V is applied to the first driving electrode 3 and the driving voltage Vd2=−30 V is applied to the second driving electrode 4, thereby providing a black view state. At this time, the driving voltage Vd3=+60 V is applied to the third driving electrode 5.

Figure 4B:
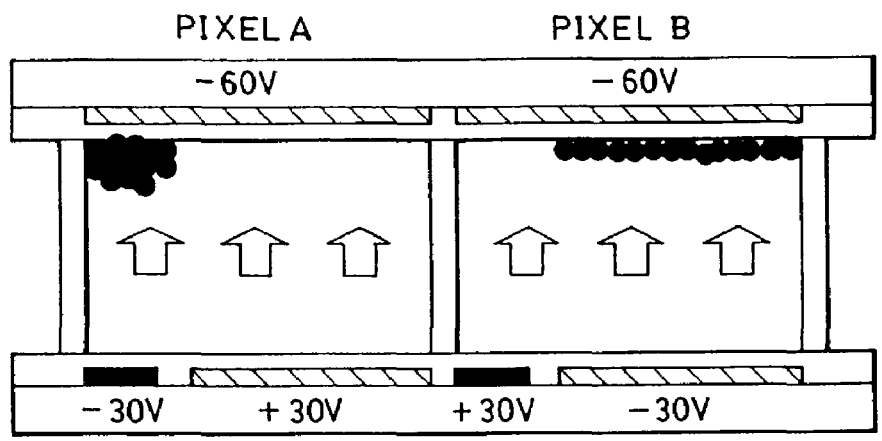

Subsequently, the driving voltage Vd3=−60 V is applied to the third driving electrode 5, causing the migratory particles 6 to be attracted onto the third driving electrode 5 by electrostatic forces. At this time, as shown in FIG. 4B, the migratory particles 6 in pixel A are transferred onto an area of the second substrate surface positioned in an opposing relation to the first driving electrode 3, and the migratory particles 6 in pixel B are transferred onto an area of the second substrate surface positioned in an opposing relation to the second driving electrode 4. Therefore, the pixel A is held in the white view state and the pixel B is held in the black view state.

Figure 4C:
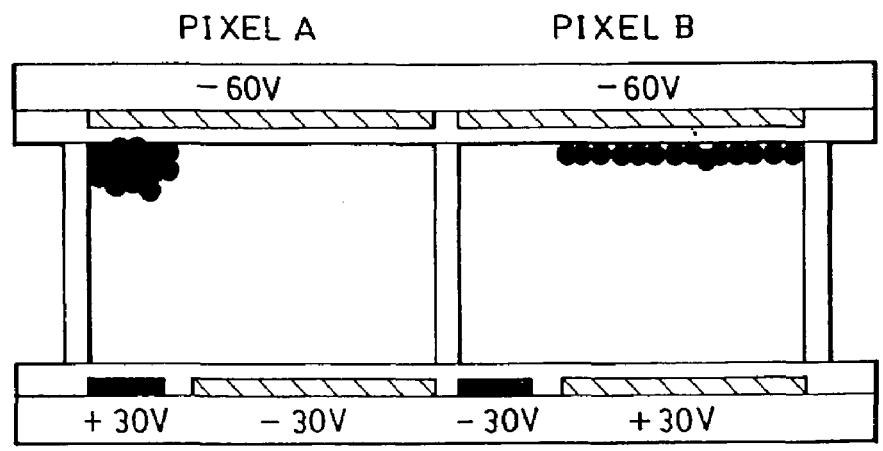

In the above condition, the polarity of the driving voltage applied to each of the first and second driving electrodes is reverted. More specifically, for the pixel A, the driving voltage $Vd1=+30$ V is applied to the first driving electrode 3 and the driving voltage $Vd2=-30$ V is applied to the second driving electrode 4. For the pixel B, the driving voltage $Vd1=-30$ V is applied to the first driving electrode 3 and the driving voltage $Vd2=+30$ V is applied to the second driving electrode 4. In spite of such a reversal of the polarity, the display state is not changed (FIG. 4C).

Electric fields produced by the voltage applied to the first driving electrode 3 and the voltage applied to the second driving electrode 4 are strong on the first substrate side and are gradually weakened as a point comes closer to the second substrate 2 away from the first substrate 1. Thus, the migratory particles 6 are substantially perfectly prevented from migrating horizontally because of two phenomena; i.e., the migratory particles 6 are attracted onto the third driving electrode 5 under the driving voltage applied to the third driving electrode 5, and the electric field tending to horizontally migrate the migratory particles 6 is weak on the second substrate side. As compared with the construction disclosed in Japanese Patent Publication No. (by PCT application) 8-507154, therefore, the voltage required to inhibit the migration of the migratory particles 6 and hold them at a standstill can be reduced to a large extent. This feature is the most important advantage of the present invention. In other words, the above feature is very effective in driving an electrophoretic display device, which does not have a definite threshold characteristic with respect to the driving voltage, by the passive matrix addressing method.

The present invention proposes two types of addressing methods for rewriting of a displayed image.

[Rewriting Method 1]

Figure 5A:
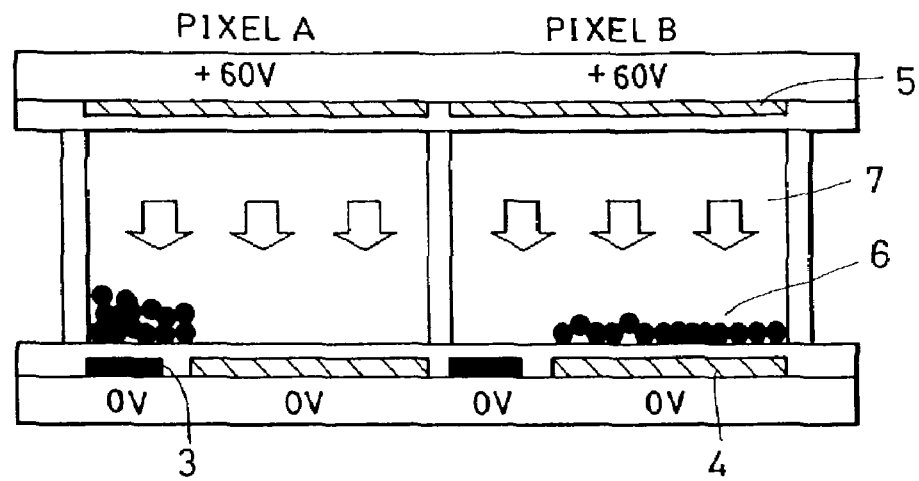
FIGS. 5A, 5B and 5C are explanatory views showing other parts of the addressing method and operational conditions in the display device shown in FIG. 4.
Figure 5B:
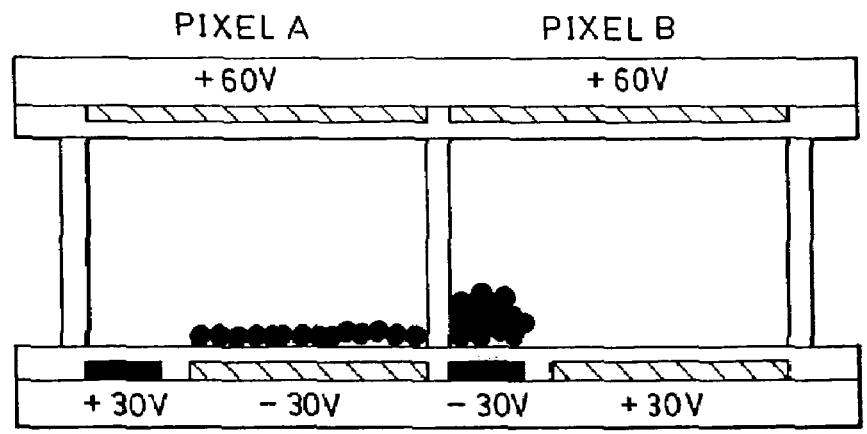

According to one display rewriting method, as shown in FIG. 5A, the driving voltages $Vd1=Vd2=0$ V are applied to the first and second driving electrodes 3, 4, and the driving voltage $Vd3=+60$ V is applied to the third driving electrode 5, whereby the migratory particles 6 are migrated away from the second substrate 2 toward the first substrate side. Then, desired display is performed pixel by pixel. Assuming that the pixel A should provide a black view, the driving voltage $Vd1=+30$ V is applied to the first driving electrode 3 and the driving voltage $Vd2=30$ V is applied to the second driving electrode 4. Also, assuming that the pixel B should provide a white view, the driving voltage $Vd1=-30$ V is applied to the first driving electrode 3 and the driving voltage $Vd2=+30$ V is applied to the second driving electrode 4. The migratory particles 6 are thereby migrated as desired (FIG. 5B). Subsequently, $Vd3=-60$ V is applied to the third driving electrode 5 again for transferring the migratory particles i.e., the display pattern, to the second substrate side as shown in FIG. 4B.

[Rewriting Method 2]

The other display rewriting method will now be described. According to this method, at the same time as applying the driving voltage $Vd3=+60$ V to the third driving electrode 5 to migrate the migratory particles 6 away from the second substrate 2 toward the first substrate side, the driving voltages are applied to the first driving electrode 3 and the second driving electrode 4 for writing.

Figure 5C:
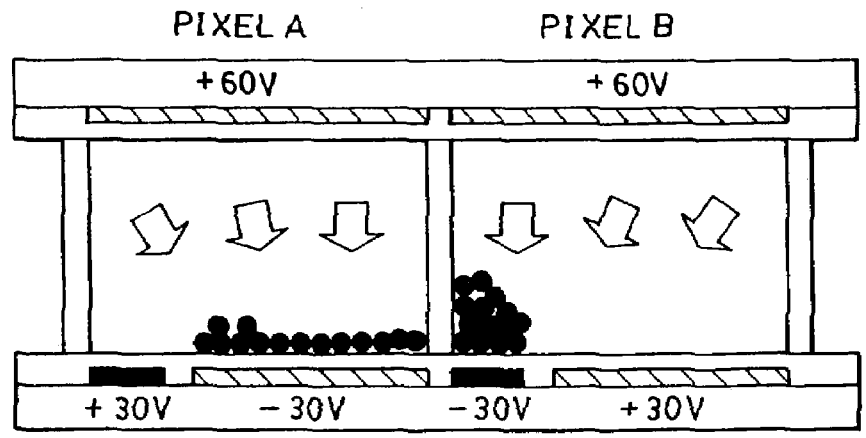
Figure 6A:
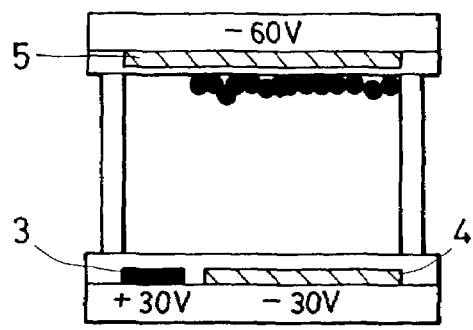
Figure 6B:
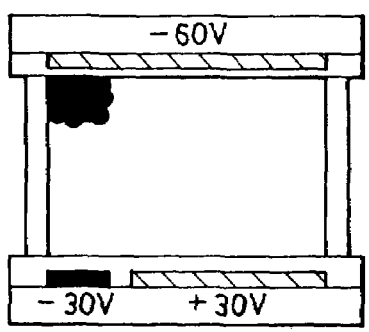
Figure 6B:
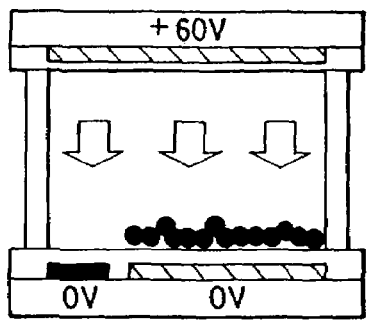
Figure 6B:
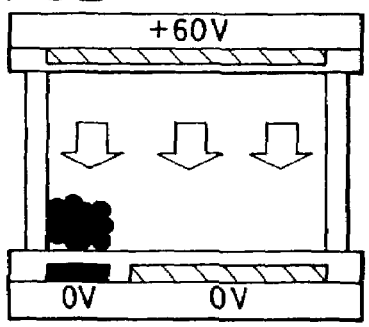
Figure 6B:
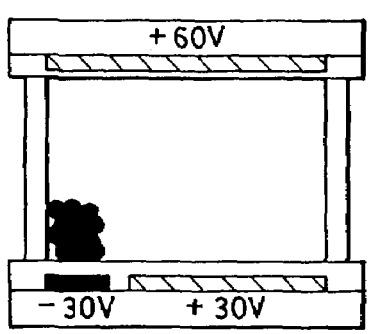
Figure 6B:
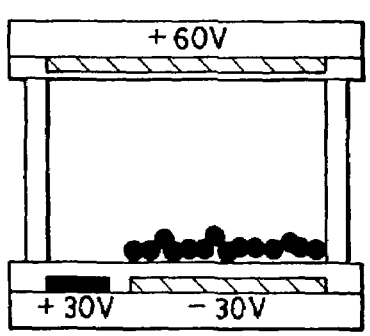
Figure 6B:
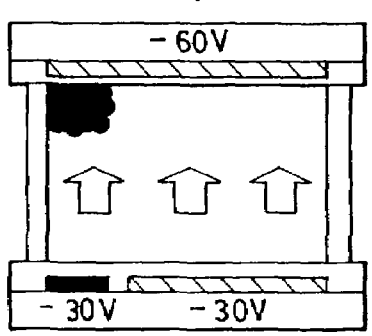
Figure 6B:
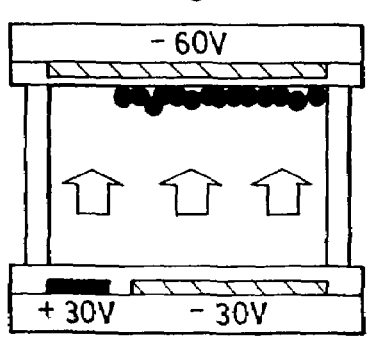
Figure 7A:
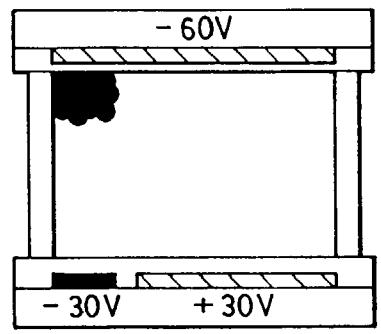
FIGS. 7A to 7F are explanatory views showing other parts of the one passive matrix addressing method for the display device shown in FIG. 6.
Figure 7B:
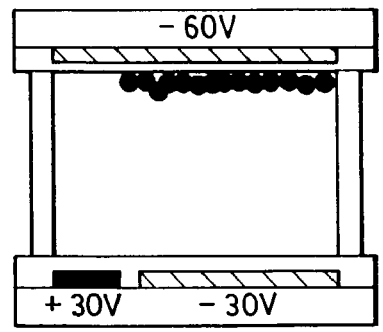
Figure 7C:
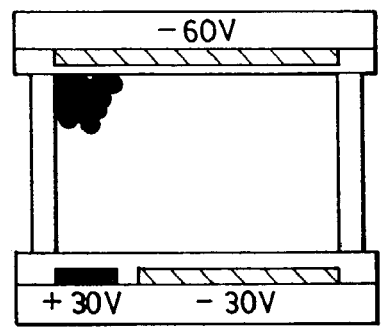
Figure 7D:
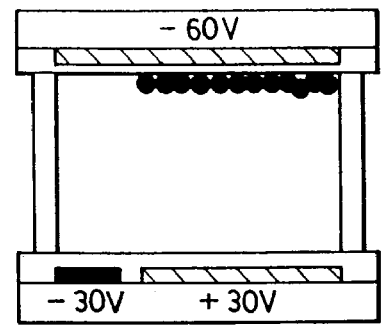
Figure 7E:
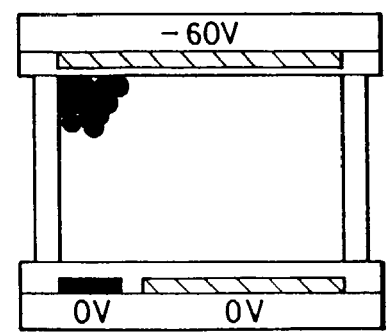
Figure 7F:
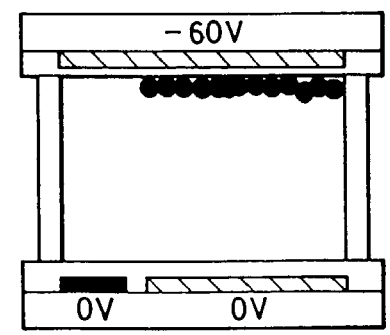
Figure 8A:
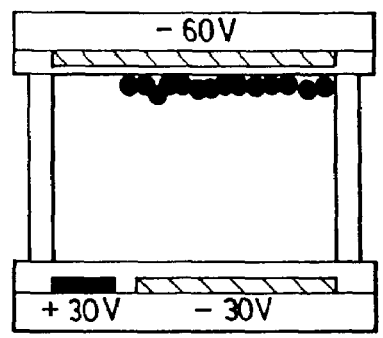
Figure 8B:
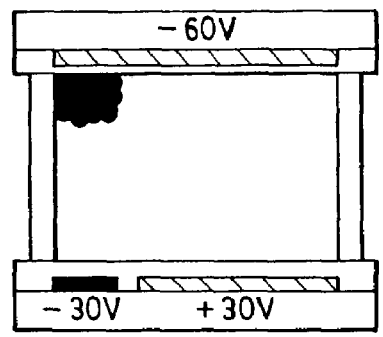
Figure 8B:
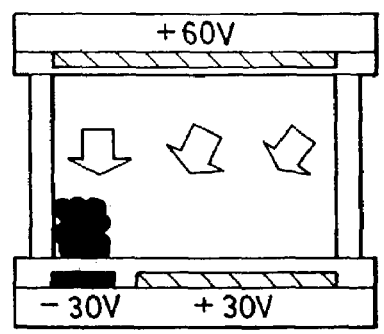
Figure 8B:
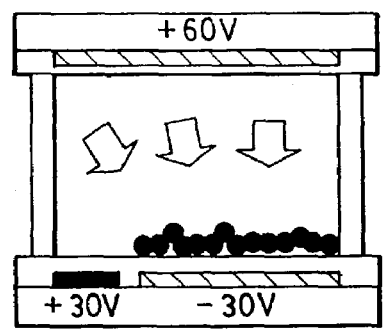
Figure 8B:
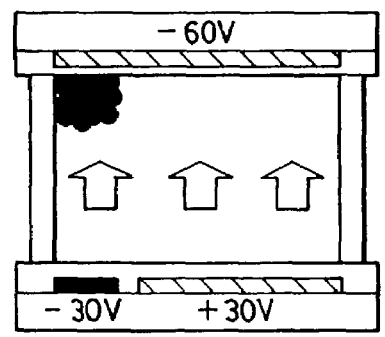
Figure 8B:
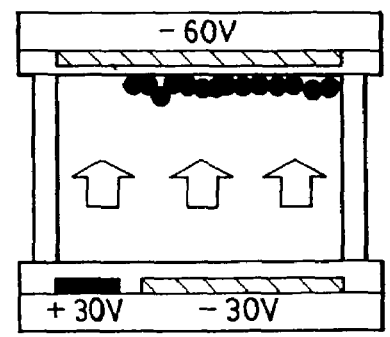
Figure 9A:
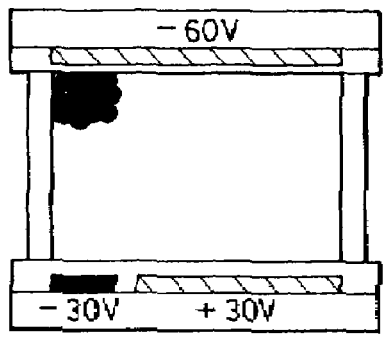
FIGS. 9A to 9D are explanatory views showing other parts of another passive matrix addressing method for the display device shown in FIG. 8.
Figure 9B:
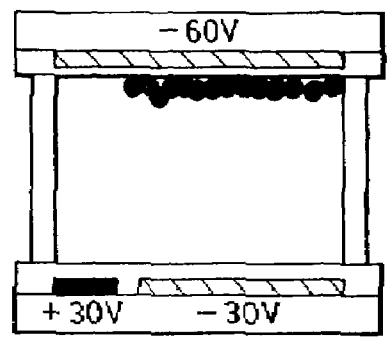
Figure 9C:
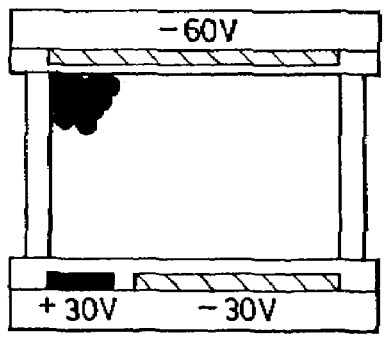
Figure 9D:
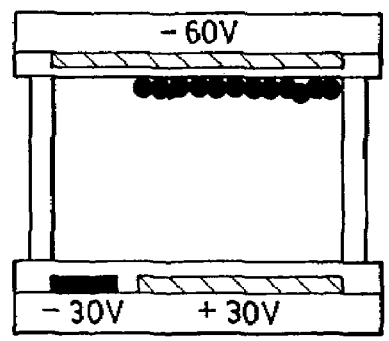

More specifically, as shown in FIG. 5C, at the moment when the driving voltage $Vd3=+60$ V is applied to the third driving electrode 5, the driving voltage $Vd1=+30$ V is applied to the first driving electrode 3 and the driving voltage $Vd2=-30$ V is applied to the second driving electrode 4 for the pixel A that should provide a black view, while the driving voltage $Vd1=-30$ V is applied to the first driving electrode 3 and the driving voltage $Vd2=+30$ V is applied to the second driving electrode 4 for the pixel B that should provide a white view. The migratory particles 6 are thereby migrated onto the first driving electrode 3 or the second driving electrode 4 to form a display pattern. Subsequently, $Vd3=-60$ V is applied to the third driving electrode 5 again for transferring the migratory particles, i.e., the display pattern, to the second substrate side as shown in FIG. 4B. This method is advantageous in shortening a write time.

(Passive Matrix Addressing Methods)

Two types of passive matrix addressing methods used in the present invention will be described below with reference to FIGS. 6 to 9. Arrows in FIGS. 6 and 9 schematically indicate vectors of an electric field produced in the cell. Let assume an electrophoretic display device of the horizontally migrating type that has an (m×n) matrix wherein m columns of pixels are arrayed in the X-direction and n rows of pixels are arrayed in the Y-direction. Corresponding to the array configuration of pixels, a number m of first data-signal electrode lines connected to the first driving electrodes 3 and a number m of second data-signal electrode lines connected to the second driving electrode 4 are arranged in the column direction, and a number n of scan-signal electrode lines connected to the third driving electrodes 5 are arranged in the row direction, the two kinds of lines crossing each other in an orthogonal relation.

[Passive Matrix Addressing Method 1]

Writing is performed in accordance with the above-described Rewriting Method 1 by selecting the scan-signal electrode lines one by one in sequence from the top in the Y-direction. The operation carried out for the selected scan-signal electrode line, which is also simply called the selected line, is first described. It is assumed that, in the display condition prior to the start of writing, a pixel to be rewritten to provide a white view is providing a black view (FIG. 6A), a pixel to be rewritten to provide a black view is providing a white view (FIG. 6B), and these black and white views are reversed upon writing.

In the selected line, as shown in FIGS. 6C and 6D, the driving voltage $Vd3=+60$ V is applied to the scan-signal electrode line, and at the same time the driving voltages $Vd1=Vd2=0$ V are applied to the first and second data-signal electrode lines, whereby the migratory particles 6 are migrated away from the third driving electrode 5 toward the first substrate side. Then, for each of those pixels in the selected line which should provide a white view, $Vd1=30$ V is applied to the first data-signal electrode line and $Vd2=+30$ V is applied to the second data-signal electrode line (FIG. 6E). Also, for each of those pixels in the selected line which should provide a black view, $Vd1=+30$ V is applied to the first data-signal electrode line and $Vd2=-30$ V is applied to the second data-signal electrode line (FIG. 6F). With such application of the driving voltages, the migratory particles 6 are horizontally migrated onto the first driving electrode 3 or the second driving electrode 4, thereby providing desired display.

After completion of the horizontal migration of the migratory particles 6, Vd3=−60 V is applied to the relevant scan-signal electrode line, whereupon the migratory particles 6 are attracted onto the third driving electrode 5 so that the display pattern is transferred to the second substrate side (FIGS. 6G and 6H). The operation to be carried out for the selected line is thus ended, and the similar write operation is then repeated for a next line as the selected line.

In the non-selected line, as shown in FIGS. 7A to 7F, the driving voltage Vd3=−60 V is continuously applied to the scan-signal electrode line. To the first and second data-signal electrode lines, there are applied −30 V or +30 V that is used when providing a white or black view, and then 0 V that is used when migrating the migratory particles 6 toward the first substrate side. However, since the migratory particles 6 are still attracted onto the second substrate side under the driving voltage applied to the third driving electrode 5, they will not horizontally migrate in spite of the driving voltages applied to the first and second data-signal electrode lines being changed between +30 V, 0 V and −30 V. As a result, the previous display condition can be held with stability.

[Passive Matrix Addressing Method 2]

Writing is performed in accordance with the above-described Rewriting Method 2 by selecting the scan-signal electrode lines one by one in sequence from the top in the Y-direction. The operation carried out for the selected scan-signal electrode line, which is also simply called the selected line, is first described. As with the above description of Passive Matrix Addressing Method 1, it is assumed that, in the display condition prior to the start of writing, a pixel to be rewritten to provide a white view is providing a black view (FIG. 8A), a pixel to be rewritten to provide a black view is providing a white view (FIG. 8B), and these black and white views are reversed upon writing.

In the selected line, the driving voltage Vd3=+60 V is applied to the scan-signal electrode line for migrating the migratory particles 6 toward the first substrate side. At the same time as applying the driving voltage Vd3=+60 V, the respective driving voltages required for providing desired display are applied to the first and second data-signal electrode lines, whereby the migratory particles 6 are migrated onto the first driving electrode 3 or the second driving electrode 4. More specifically, for each of those pixels in the selected line which should provide a white view, Vd1=−30 V is applied to the first data-signal electrode line and Vd2=+30 V is applied to the second data-signal electrode line (FIG. 8C). Also, for each of those pixels in the selected line which should provide a black view, Vd1=+30 V is applied to the first data-signal electrode line and Vd2=−30 V is applied to the second data-signal electrode line (FIG. 8D). After completion of the migration of the migratory particles 6, Vd3=−60 V is applied to the relevant scan-signal electrode line, whereupon the migratory particles 6 are attracted onto the third driving electrode 5 so that the display pattern is transferred to the second substrate side (FIGS. 8E and 8F).

In the non-selected line, as shown in FIGS. 9A to 9D, the driving voltage Vd3=−60 V is continuously applied to the scan-signal electrode line. To the first and second data-signal electrode lines, there are applied −30 V or +30 V that is used when providing a white or black view, and then 0 V that is used when migrating the migratory particles 6 toward the first substrate side. However, since the migratory particles 6 are still attracted onto the second substrate side under the driving voltage applied to the third driving electrode 5, they will not horizontally migrate in spite of the driving voltages applied to the first and second data-signal electrode lines being changed between +30 V and −30 V. As a result, the previous display condition can be held with stability.

Thus, in the electrophoretic display device of the horizontally migrating type according to the present invention, a high quality image can be displayed by the passive matrix addressing without causing any crosstalk.

(Variations of Construction)

The addressing method as the feature of the present invention is not limited in its applications to the display device having the construction shown in FIG. 1. Other constructions of the display device, to which the addressing method of the present invention is effectively applicable, will be described below with reference to the drawings.

Figure 10:
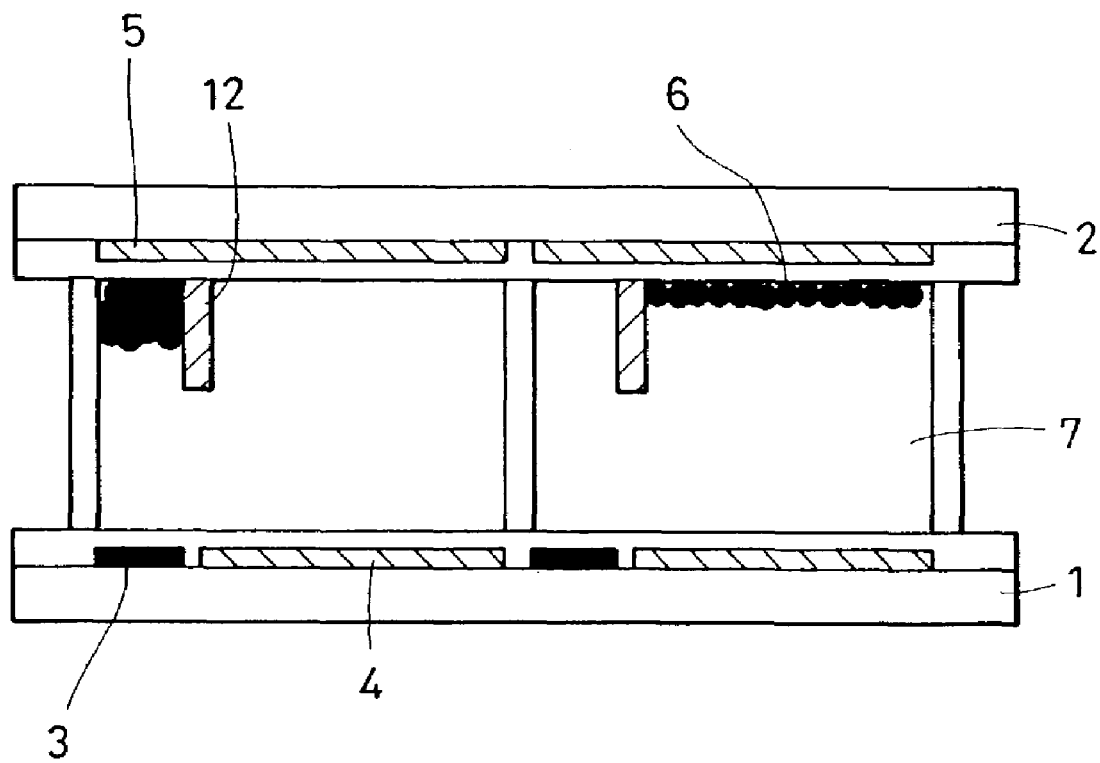
FIG. 10 is a sectional view of still another typical example of the display device of the present invention.

FIG. 10 shows a construction of the display device of the present invention wherein a barrier 12 is provided as an obstacle on the surface of the third driving electrode 5 arranged on the underside of the second substrate 2. More specifically, the barrier 12 is provided in an opposing relation to the boundary between the first driving electrode 3 and the second driving electrode 4, and has a height several to several tens times the diameter of the migratory particles 6. Thus, the barrier 12 is featured in having a function to substantially inhibit the horizontal migration of the migratory particles 6. When the migratory particles 6 are attracted onto the third driving electrode 5 after the writing, the migratory particles can be prevented from migrating horizontally by the presence of the barrier 12 even if the driving voltage applied to the third driving electrode 5 is lowered to reduce attraction forces toward the second substrate side. Accordingly, the barrier 12 serves as a very effective means for achieving high-contrast display at a relatively low voltage.

Figure 11:
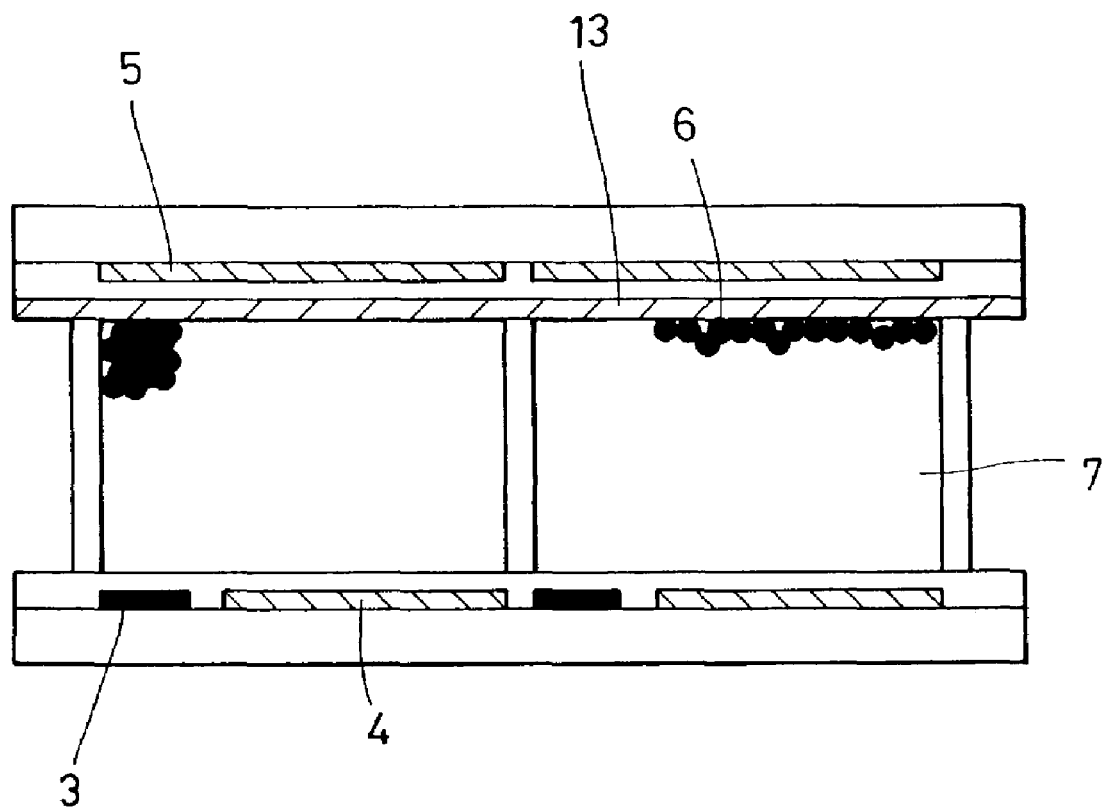
FIG. 11 is a sectional view of still another typical example of the display device of the present invention.

FIG. 11 shows another construction of the display device of the present invention wherein a charged film 13 is disposed on the surface of the third driving electrode 5 arranged on the underside of the second substrate 2, the charged film 13 having surface charges which are constantly electrified with a polarity opposite to that of the charged migratory particles 6. The charged film 13 is preferably made of a ferroelectric material or an electret material. In addition to the electrostatic forces produced by the driving voltage and acting on the migratory particles 6 to attract them onto the third driving electrode 5, electrostatic forces produced by the surface charges of the charged film 13 also act to draw the migratory particles and prevent them from migrating horizontally. Therefore, even when the driving voltage for producing the electrostatic forces to attract the migratory particles 6 toward the third driving electrode 5 is lowered, high-contrast display can be provided.

Figure 12:
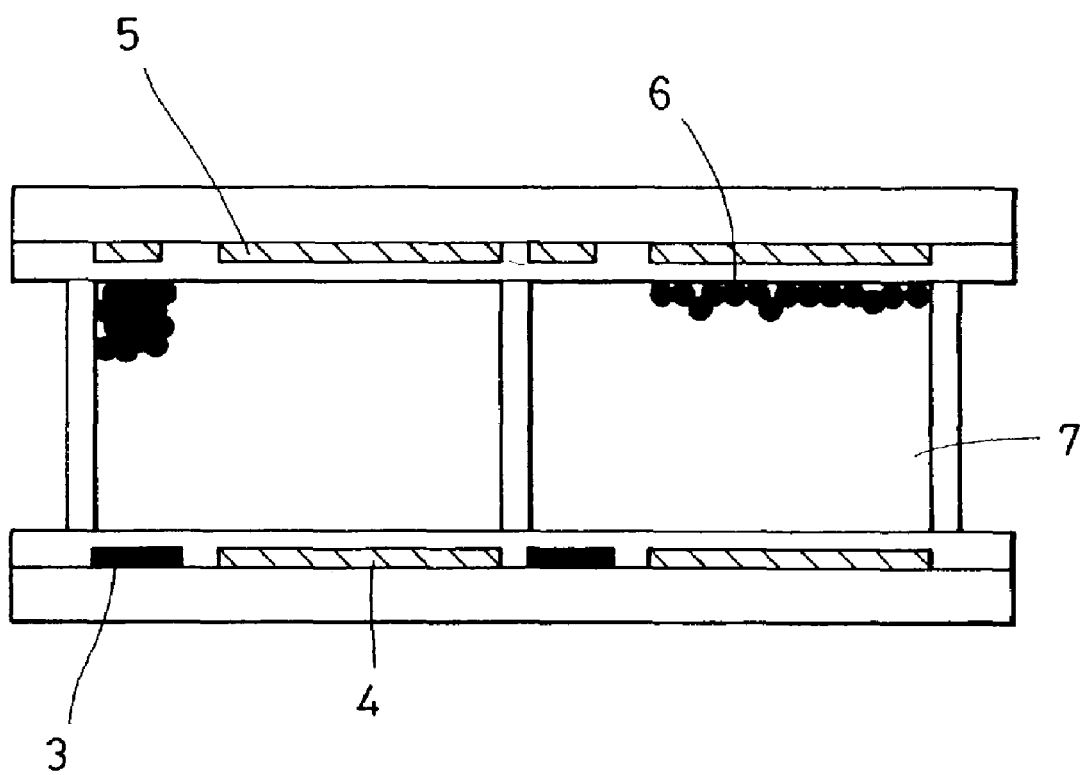
FIG. 12 is a sectional view of still another typical example of the display device of the present invention.

The third driving electrode 5 arranged on the underside of the second substrate 2 is not always required to cover the entire pixel. In a construction shown in FIG. 12, for example, a third driving electrode 5 having a cutout formed in its part opposing to the boundary between the first driving electrode 3 and the second driving electrode 4 is disposed on the underside of the second substrate 2 in the construction of FIG. 1. The construction of FIG. 12 is advantageous in that the display pattern is more surely transferred with the migration of the migratory particles 6 in the write operation in accordance with the addressing method described above with reference to FIGS. 4 and 5.

Figure 13A:
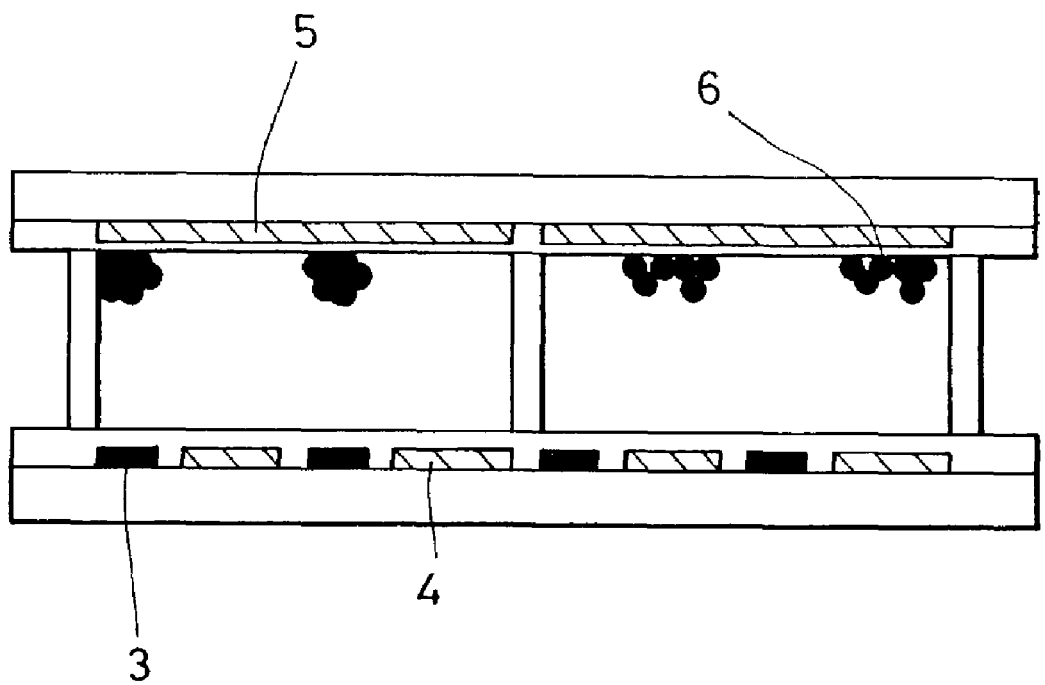
FIGS. 13A and 13B are each a sectional view of still another typical example of the display device of the present invention.
Figure 13B:
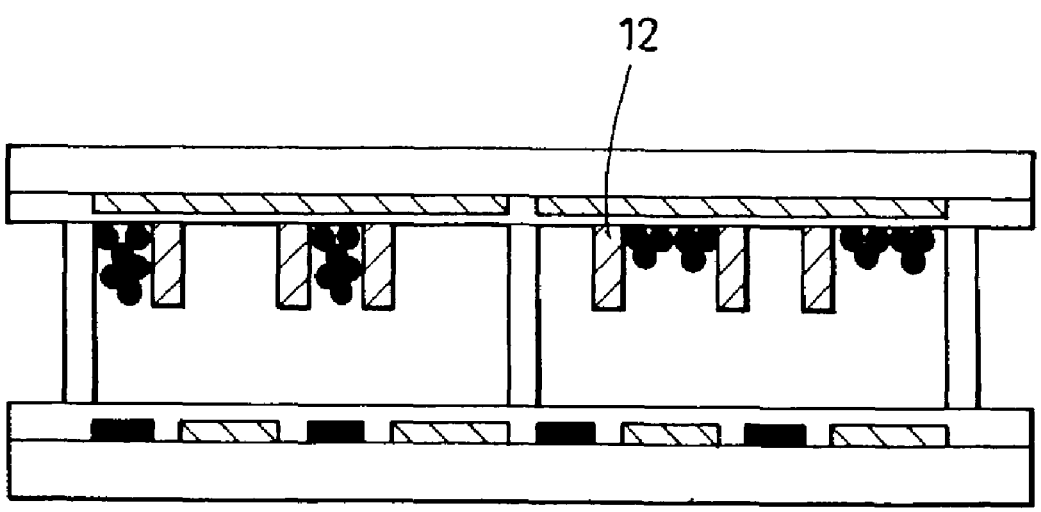

In the above description, one pair of the first driving electrode 3 and the second driving electrode 4 is arranged in each pixel for the sake of explanation. However, the number of electrodes disposed in each pixel is not limited to a particular value in the present invention, and as a matter of course plural pairs of electrodes may also be disposed in each pixel. FIGS. 13A and 13B each show a construction in which two pairs of electrodes are disposed in each pixel. FIG. 13A corresponds to the construction of FIG. 1, and FIG. 13B corresponds to the construction of FIG. 10.

(Materials and Manufacturing Methods of Components)

The method of manufacturing the display device of this embodiment will be described below with reference to FIG. 1. First, the first driving electrodes 3 and the second driving electrodes 4 are formed and patterned into predetermined shapes on the first substrate 1. Then, the third driving electrodes 5 are likewise formed and patterned into predetermined shapes on the second substrate 2. Each substrate may be made of any of inorganic materials including polymer films such as polyethylene terephthalate (PET) and polyether sulfone (PES), glass, and quartz. The driving electrode may be made of any material so long as it is capable of patterning. Materials of the transparent electrode may be, e.g., indium tin oxide (ITO).

The surface of the driving electrode may be colored by utilizing the color of an electrode material itself or the color of an insulating layer material itself formed on the electrode material, or by forming a layer of a material having a desired color on the electrode, the insulating layer or the substrate surface. As an alternative, the insulating layer, for example, may be mixed with a coloring material.

Subsequently, an insulating layer 8 is formed on both the first driving electrode 3 and the second driving electrode 4, and an insulating layer 9 is formed on the third driving electrode 5. Materials of each insulating layer are preferably hard to produce pinholes in the form of a thin film and have a low dielectric constant. Such materials include, for example, amorphous fluorocarbon resins, highly transparent polyimides, and PET. A film thickness of the insulating layer is preferably on the order of 100 nm to 1 μm.

Then, the partitions 10 are formed on the second substrate 2. A height of each partition 10 is preferably not larger than 500 μm so that flexibility is ensured. If the distance between the first substrate 1 and the second substrate 2 is large, the transfer time of the display pattern is prolonged and the driving voltage must be increased. From the practical point of view, therefore, the partition height is preferably not larger than 100 μm. Also, taking into account the diameter of the migratory particles 6, the partition height is preferably not smaller than the particle diameter. Further, taking into account the migration of the migratory particles between the first or second driving electrode and the third driving electrode for transfer display, the partition height is preferably not smaller than twice the particle diameter. Moreover, in order that the migratory particles are less affected by electric fields produced by the voltages applied to the first driving electrode and the second driving electrode in the non-selected line, the partition height is preferably not smaller than five times the particle diameter.

The partitions 10 are not particularly limited in arrangement, but they are preferably arranged to surround each pixel so that the migratory particles 6 will not migrate between the pixels. A polymer resin is used as a material of the partitions 10. The partitions 10 may be formed in any suitable manner. For example, the partitions 10 are formed by a method of coating a photosensitive resin layer and patterning the layer through the steps of exposure and wet development, or a method of bonding partitions prepared separately, or a printing method. Alternatively, a method of forming partitions on the surface of the light-transparent first substrate by molding is also usable.

Then, the transparent dielectric liquid 7 and the migratory particles 6 are filled in each pixel space surrounded by the partitions 10. A colorless transparent liquid, such as silicone oil, toluene, xylene, high-purity petroleum, is used as the dielectric liquid 7. The migratory particles 6 being black are made of a material that exhibits good charging characteristics in the dielectric liquid 7. Such a material is, e.g., a resin, such as polyethylene or polystyrene, mixed with carbon, etc. In consideration of the height of the partitions 10, the diameter of the migratory particles 6 is usually in the range of about 0.1 μm to 10 μm.

Then, after forming an adhesive layer on a joint surface of the first substrate 1 to the second substrate 2, the first and second substrates 1, 2 are aligned with each other and bonded together under heating. A display device is completed by connecting voltage applying means to the bonded assembly.

The barriers 12 on the second substrate 2, shown in FIG. 10, can be formed using a material and a method similar to those used for forming the partitions 10. More specifically, a polymer resin is used as a material of the barriers 12. Further, the barriers 12 are formed by a method of coating a photosensitive resin layer and patterning the layer through the steps of exposure and wet development, or a method of bonding barriers prepared separately, or a printing method. Alternatively, a method of forming barriers on the surface of the light-transparent second substrate by molding is also usable.

The charged film 13 on the second substrate 2, shown in FIG. 11, can be made of any of ferroelectric materials and electret materials.

When ferroelectric materials are used, preferable examples of the materials include inorganic compounds such as lead zirconate titanate (PZT), lead lanthanum-added zirconate titanate (PLZT) and barium titanate, and organic polymers such as polyvinylidene fluoride (PVDF) and a copolymer of vinylidene fluoride and trifluoroethylene (PVDF/PTrFE). In this case, the charged film 13 can be formed by, e.g., the sol-gel process, the sputtering process or the CVD (Chemical Vapor Deposition) process.

When electret materials are used, fluorocarbon resins such as Teflon (Teflon-FEP and Teflon-TFE) provide superior characteristics. Other preferable materials are, for example, polyethylene, polypropylene, polystyrene, polymethyl methacrylate, polyvinyl chloride, polyethylene terephthalate, and polyimide. In this case, the charged film 13 can be formed by, e.g., the thermo-electret process, the electro-electret process, the radio-electret process, the photo-electret process, or the mechano-electret process.

EXAMPLES

The present invention will be described in more detail in connection with Examples.

Example 1

In this Example, a (3×3)-matrix display cell having the cell construction shown in FIG. 1 was fabricated and operated in accordance with the above-described Passive Matrix Addressing Method 1 to implement the passive matrix addressing based on bi-directional writing. The bi-directional writing is difficult to realize with the construction disclosed in the above-cited Japanese Patent Publication No.

(by PCT application) 8-507154, and is one feature specific to the present invention. With this feature, the display cell of this Example is able to perform the bi-directional writing, i.e., changes from a white to black view and writing from a black to white view.

Figure 14:
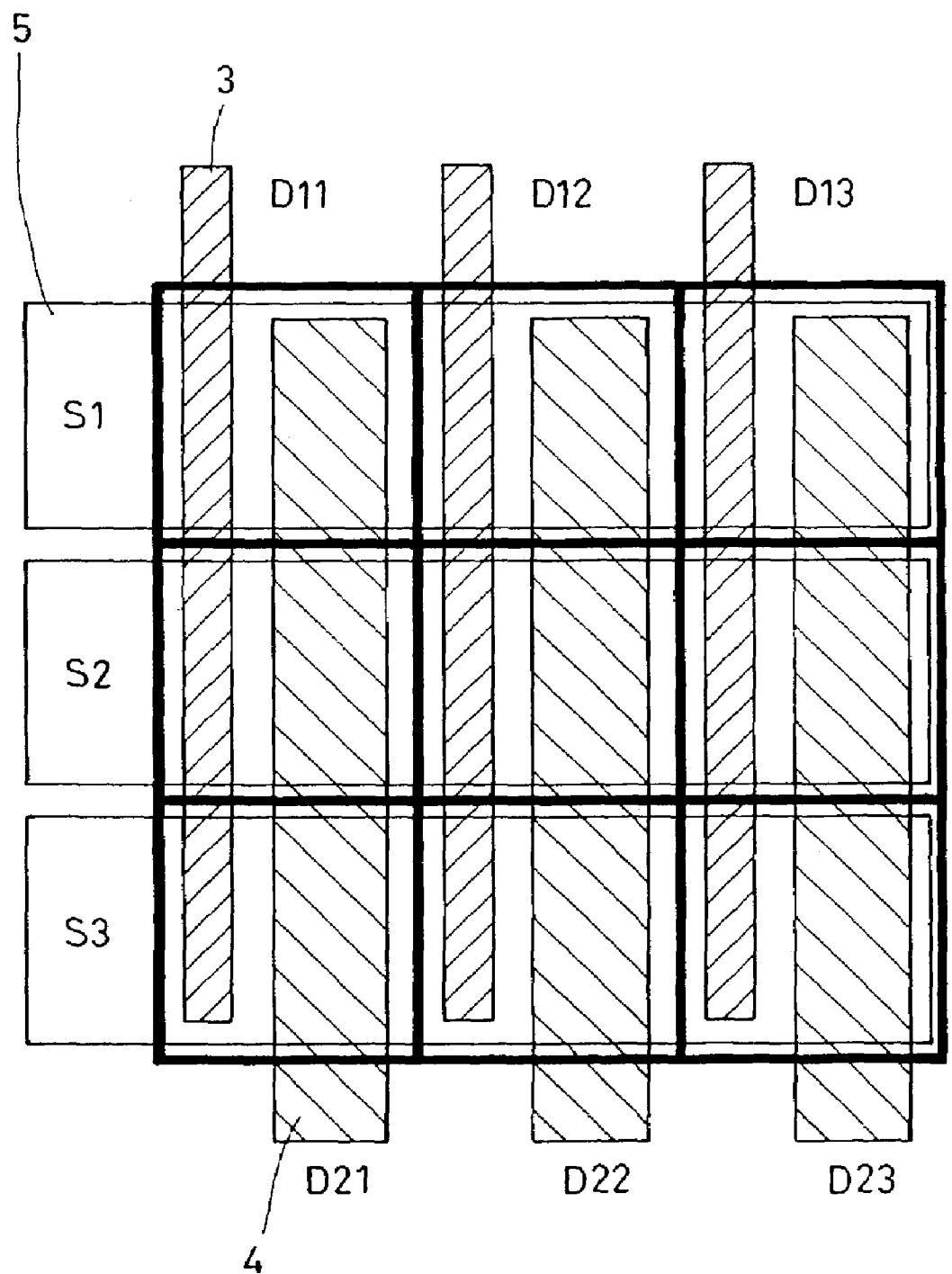
FIG. 14 is a plan view showing a configuration of a 3×3 matrix fabricated in Example 1 of the present invention.

FIG. 14 is a plan view of the (3×3)-matrix display cell thus fabricated. The size of one pixel was 1 mm×1 mm, and the area ratio of the first driving electrode to the second driving electrode was 20:80.

A method of manufacturing the cell will be briefly described below with reference to FIGS. 1 and 14. First, an insulating layer 8 made of an acrylic resin containing a white pigment, such as alumina, dispersed therein was formed on an overall surface of a first substrate 1 formed of a PET film having a thickness of 200 μm. Then, an ITO film was formed as a second driving electrode 4 on the insulating layer 8 at a low temperature and patterned into a shape as shown through the steps of photolithography and dry etching. Then, a deep-black titanium carbide film was formed as a first driving electrode 3 on the insulating layer 8 and patterned in a similar manner. Then, another insulating layer 8 made of an amorphous fluorocarbon resin was formed in a thickness of 200 nm on the overall surface.

Subsequently, an ITO film was formed as a third driving electrode 5 on a second substrate 2 formed of a PET film at a low temperature and patterned into a shape as shown. An insulating layer 9 made of an amorphous fluorocarbon resin was then formed in a thickness of 200 nm on the overall surface. Partitions 10 were formed on the insulating layer 9. The partitions 10 were formed in a height of 70 μm by coating a photosensitive epoxy resin and patterning the coated resin through the steps of exposure and wet development. A dielectric liquid 7 and black charged migratory particles 6 were filled in each space surrounded by the formed partitions 10.

Silicone oil was used as the dielectric liquid 7. A mixture of polystyrene and carbon, having an average particle diameter of about 1 μm, was used as the black charged migratory particles 6. The migratory particles 6 were positively charged in the silicone oil. Then, a pattern of thermally fusing adhesive layer was formed on a joint surface of the first substrate 1 to the second substrate 2, and the first substrate 1 was placed on the partitions 10 formed on the second substrate 2 while properly aligning both the substrates with each other. The first and second driving electrodes 3, 4 were then bonded together under heating. A display device was completed by connecting voltage applying circuits (not shown) to the bonded assembly.

The addressing method in this Example will be described below.

The first driving electrodes 3 were used as first data-signal electrode lines (D11–D13), the second driving electrodes 4 were used as second data-signal electrode lines (D21–D23), and the third driving electrodes 5 were used as scan-signal electrode lines (S1–S3).

Figure 15A:
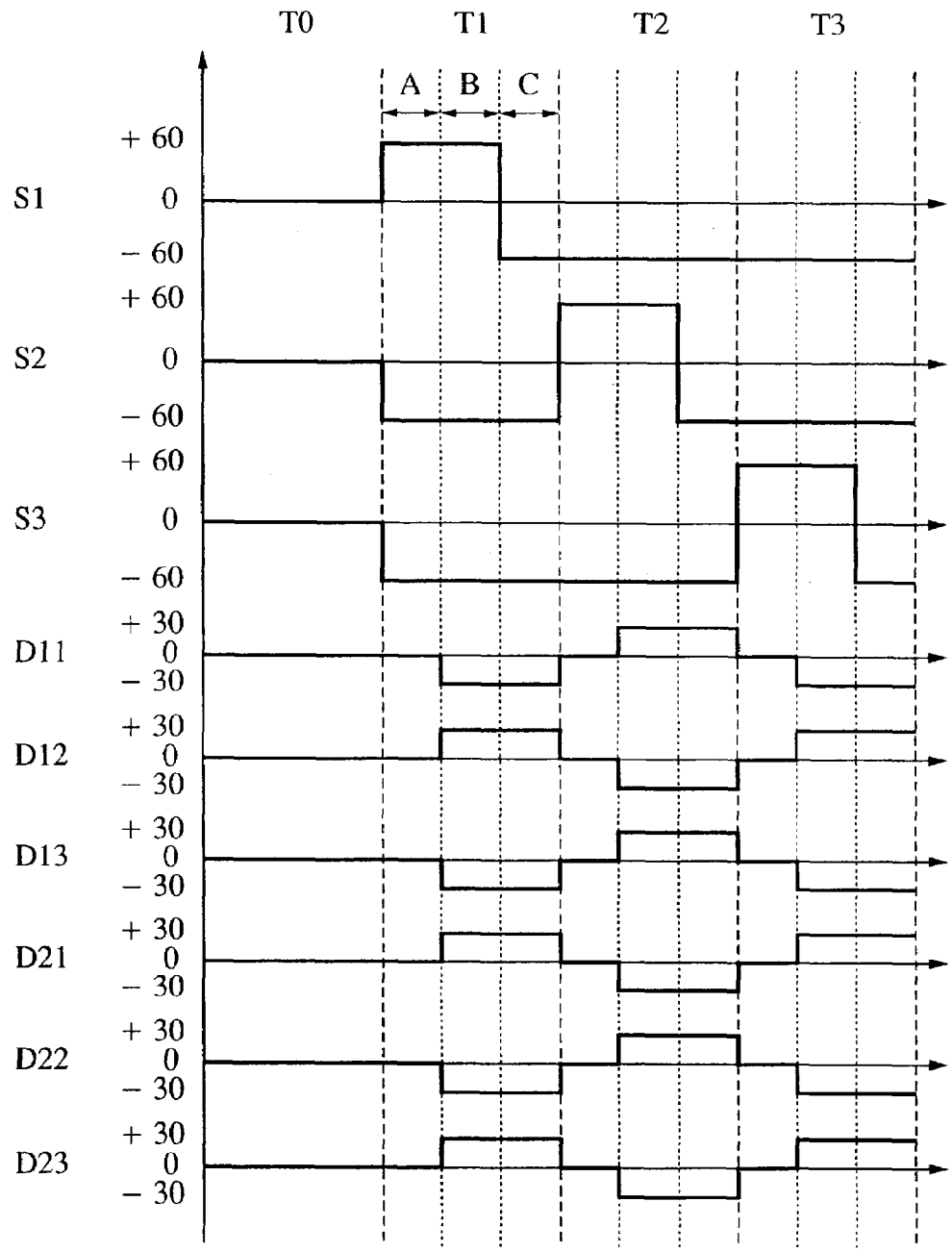
FIGS. 15A and 15B show respectively a time chart and a display pattern for matrix addressing performed in Example 1 of the present invention.
Figure 15B:
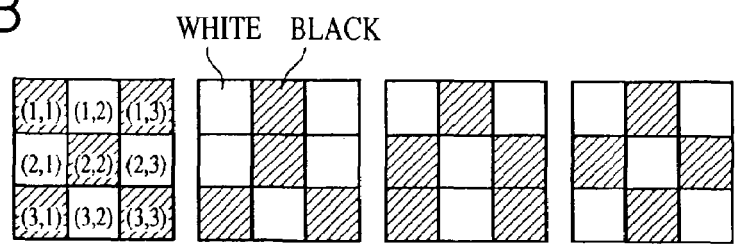

FIG. 15A is a time chart of driving voltages applied to the first and second data-signal electrode lines and the scan-signal electrode lines, and FIG. 15B shows a change of the display condition in each time period. In FIGS. 15A and 15B, each time period (T1, T2 or T3) is set to 90 msec. Further, a time period A represents a period in which the migratory particles are moved away from the third driving electrode, and is set to 30 msec. A time period B represents a period in which the migratory particles are horizontally migrated, and is set to 30 msec. A time period C represents a period in which a display pattern is transferred onto the third driving electrode, and is set to 30 msec.

Since the bi-directional writing is possible, an initial operation to perform total reset is not required in this Example. It is assumed in this Example that a pattern shown in a time period T0 is given as an initial display pattern, and all pixels are reversed in display condition, i.e., color in view, for each of the scan-signal electrode lines (S1–S3). Note that writing of information was performed in this Example in accordance with the Passive Matrix Addressing Method 1 described above with reference to FIGS. 6 and 7. The detailed behavior of the migratory particles in the write operation is similar to that in the explanation of the Passive Matrix Addressing Method 1 and therefore is not described herein.

The addressing method will now be described in sequence following the time chart of FIG. 15A. In the time period T1, the driving voltages were applied to the respective lines in three stages. First, in the time period A, Vd3=+60 V was applied to the scan-signal electrode line S1, which is selected at that time (i.e., a selected line), and Vd3=−60 V was applied to the scan-signal electrode lines S2, S3, which are not selected at that time (i.e., non-selected lines). Also, 0 V was applied to all of the first data-signal electrode lines (D11–D13) and all of the second data-signal electrode lines (D21–D23).

In the next time period B, as white-view writing voltages, Vd1=−30 V was applied to the first data-signal electrode lines D11, D13 corresponding to the pixels (1,1) and (1,3), and Vd2=+30 V was applied to the second data-signal electrode lines D21, D23 corresponding to them. Also, as black-view writing voltages, Vd1=+30 V was applied to the first data-signal electrode line D12 corresponding to the pixel (1,2), and Vd2=−30 V was applied to the second data-signal electrode line D22 corresponding to the same. As a result, all pixels in the scan-signal electrode line S1 as the selected line were rewritten and reversed in display condition.

Then, in the time period C, Vd3=−60 V was applied to the scan-signal electrode line S1 as the selected line for transferring the rewritten display pattern onto the second substrate. During the time period T1, each of the pixels in the scan-signal electrode lines S2, S3 as the non-selected lines was maintained in the initial display condition.

Subsequently, the addressing was successively performed in the time periods T2 and T3 in a similar manner according to a selected pixel pattern. As a result, an objective reversed display pattern was obtained with a high contrast. A deterioration of contrast due to crosstalk and failures in the migration and holding of the migratory particles was not observed in the obtained display. An average contrast ratio of white view to black view was as high as about 10:1.

Comparative Example 1

Figure 17A:
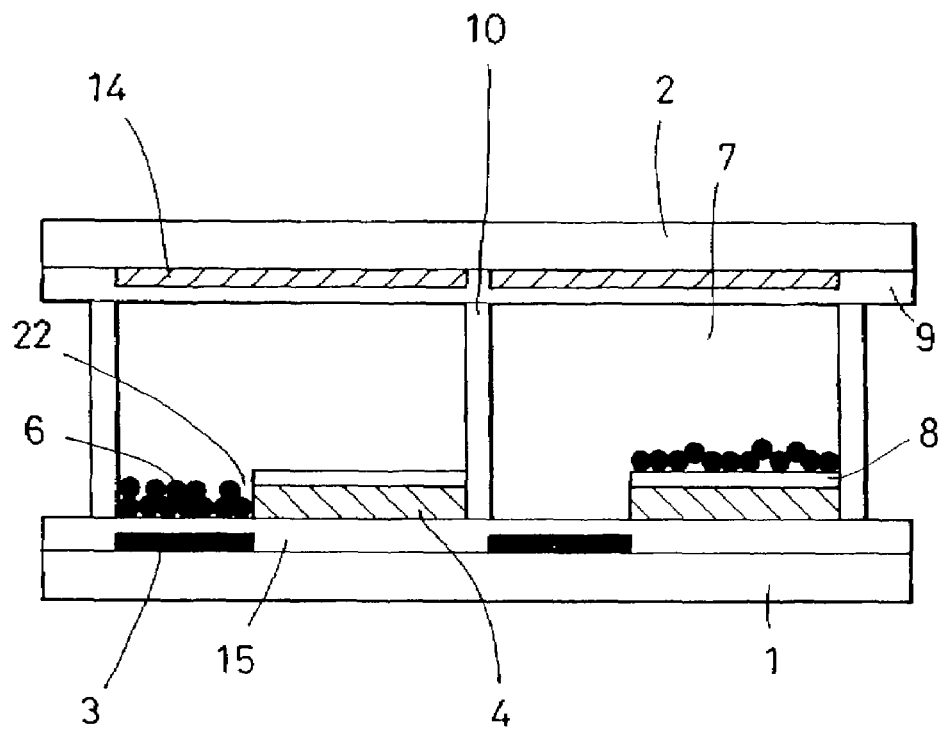
FIGS. 17A and 17B are each a sectional view of a conventional display device.
Figure 17B:
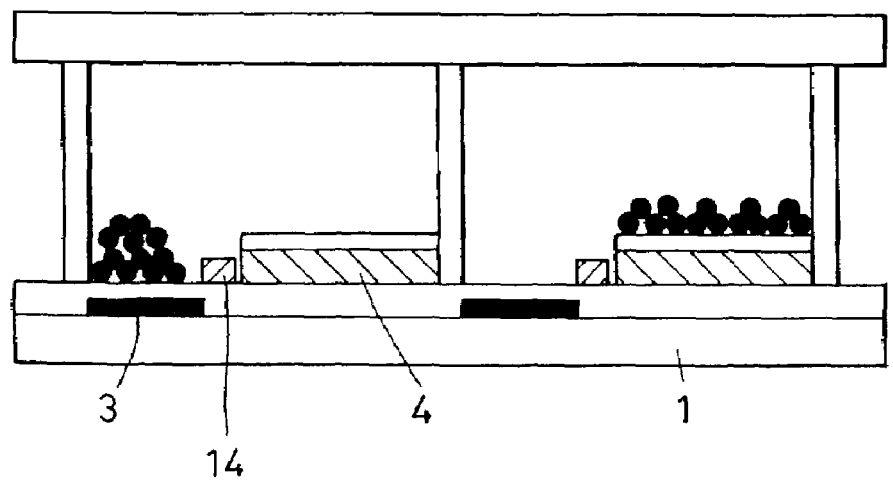
Figure 18:
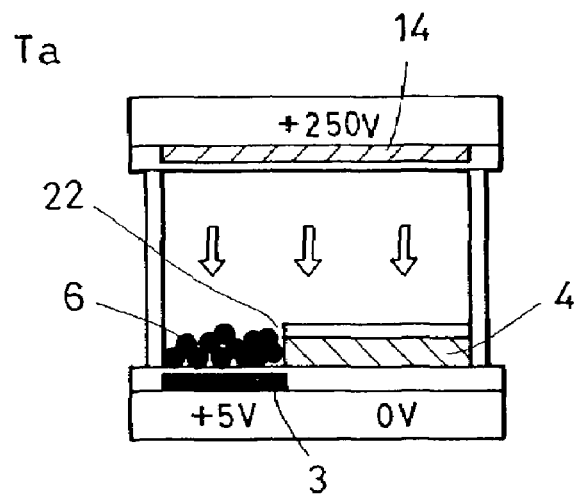
FIG. 18 shows an addressing method and operational conditions in one conventional display device.
Figure 18:
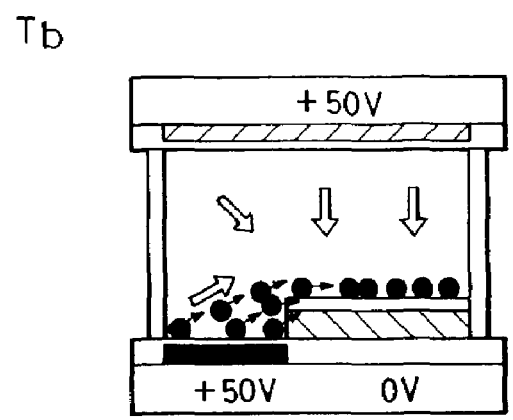
Figure 18:
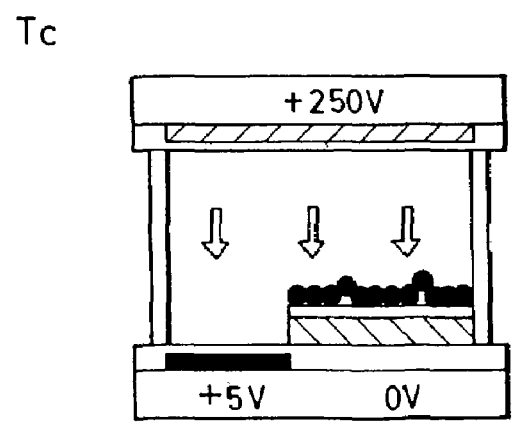
Figure 19:
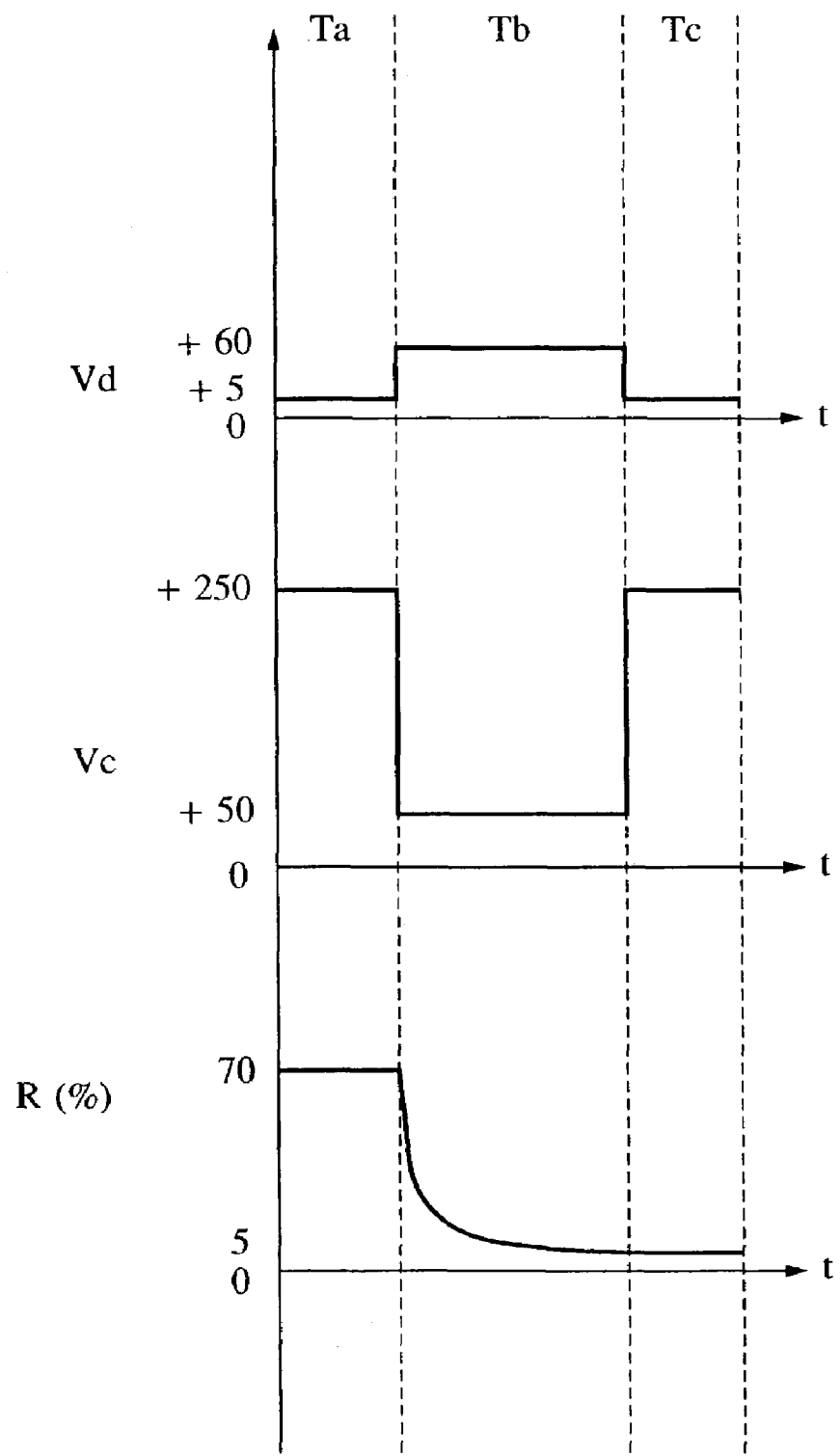
FIG. 19 is a chart showing the addressing method and operational conditions in the one conventional display device.
Figure 20A:
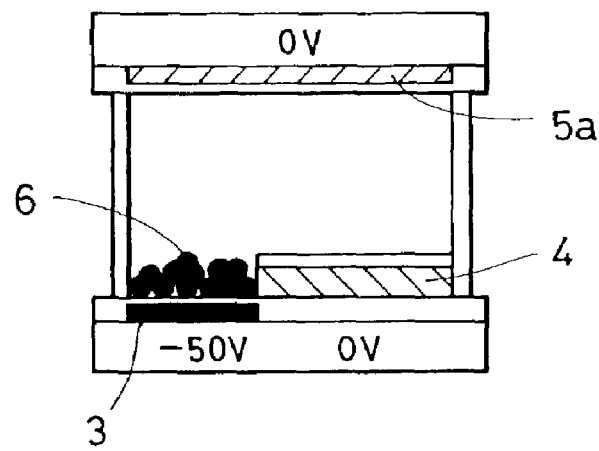
FIGS. 20A, 20B and 20C are explanatory views showing part of a passive matrix addressing method in the one conventional display device.
Figure 20B:
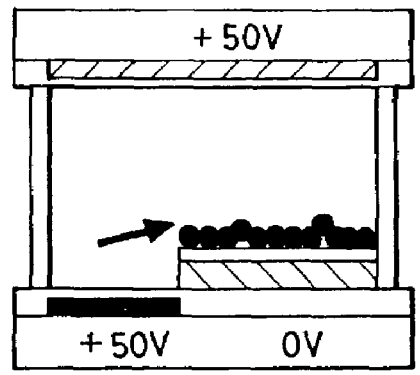
Figure 20C:
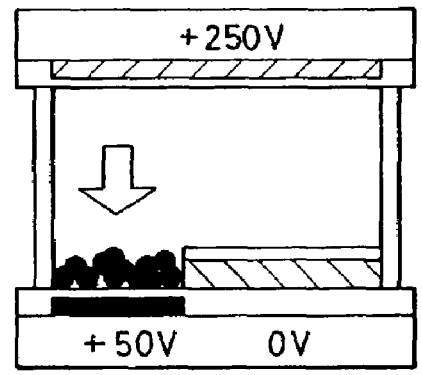
Figure 21A:
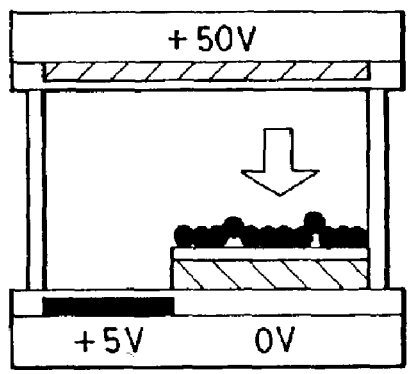
FIGS. 21A to 21D are explanatory views showing other parts of the passive matrix addressing method in the one conventional display device.
Figure 21B:
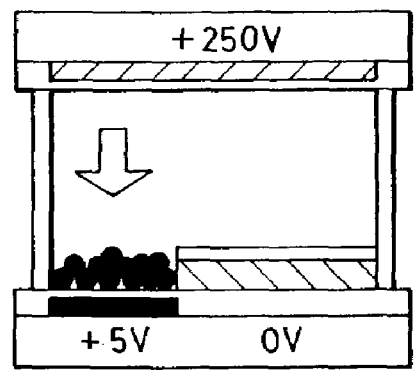
Figure 21C:
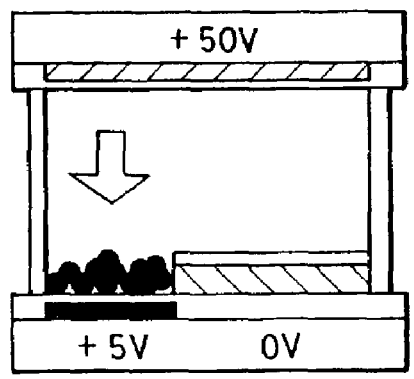
Figure 21D:
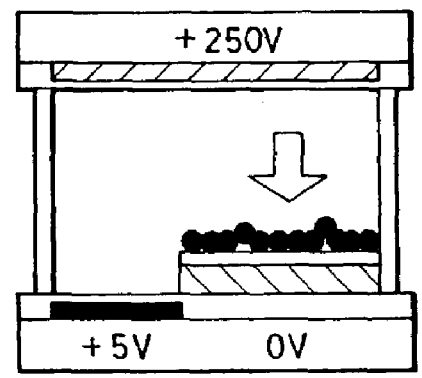

As Comparative Example 1, a (3×3)-matrix display cell having the cell construction, shown in FIG. 17A, as disclosed in the above-cited Japanese Patent Publication No. (by PCT application) 8-507154 was fabricated and operated in accordance with the passive matrix addressing based on unidirectional writing.

Figure 24:
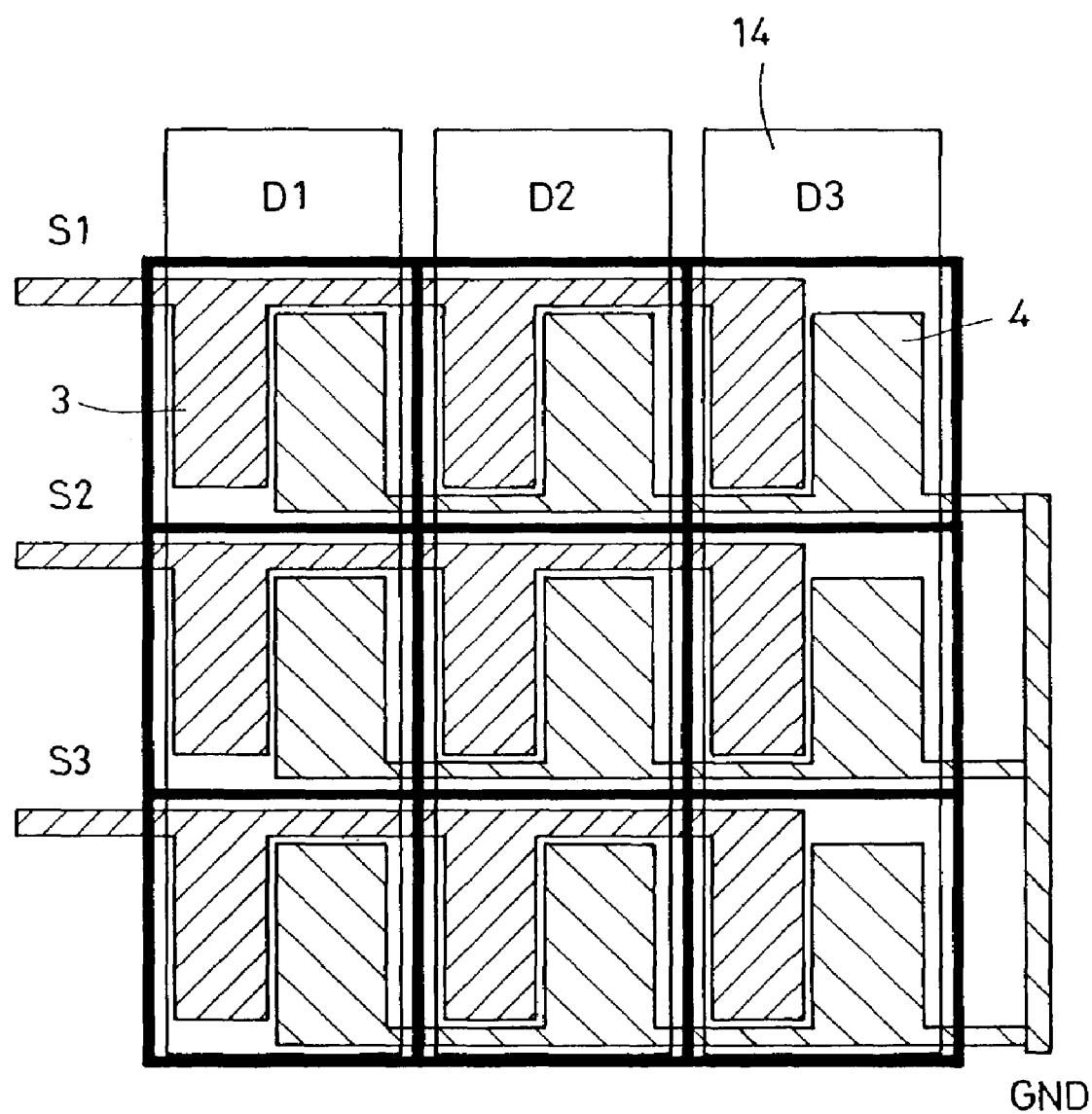
FIG. 24 is a plan view showing a configuration of a 3×3 matrix fabricated as a Comparative Example.

FIG. 24 is a plan view of the (3×3)-matrix display cell thus fabricated. The size of one pixel was 1 mm×1 mm, and the area ratio of the first driving electrode 3 to the second driving electrode 4 was 35:65. The spacing between the first substrate and the second substrate was 70 μm and the height of the step 15 was 0.3 μm. Positively charged migratory particles having an average particle diameter of 1 μm were used. The driving electrodes and the migratory particles were colored in the same manner as made in the construction of FIG. 1.

A method of manufacturing the cell will be briefly described below with reference to FIGS. 17A and 24. First, an insulating layer 8 made of an acrylic resin containing a white pigment, such as alumina, dispersed therein was formed on an overall surface of a first substrate 1 formed of a PET film having a thickness of 200 μm. Then, a deep-black titanium carbide film was formed as a first driving electrode 3 on the insulating layer 8 and patterned into a shape as shown through the steps of photolithography and dry etching.

Then, an epoxy resin film was coated in a thickness of 0.3 μm, and in succession an ITO thin film was formed as a second driving electrode 4 at a low temperature by magnetron sputtering. Subsequently, a resist film was coated and patterned into a shape as shown. Finally, the first substrate 1 was subjected to reactive dry etching using $CF_4$ and $O_2$ gases. As a result, a structural member having the second driving electrodes 4 arranged on the steps 15 with the height of 0.3 μm was fabricated. Thereafter, another insulating layer 8 made of an amorphous fluorocarbon resin was formed in a thickness of 200 nm on the overall surface.

Subsequently, an ITO film was formed as a control driving electrode 14 on a second substrate 2 formed of a PET film at a low temperature and patterned into a shape as shown. An insulating layer 9 made of an amorphous fluorocarbon resin was then formed in a thickness of 200 nm on the overall surface. Partitions 10 were formed on the insulating layer 9. The partitions 10 were formed in a height of 70 μm by coating a photosensitive epoxy resin and patterning the coated resin through the steps of exposure and wet development. A dielectric liquid 7 and black charged migratory particles 6 were filled in each space surrounded by the formed partitions 10.

The subsequent process is exactly the same as those described above in Example 1, and hence a description thereof is omitted herein.

The addressing method in Comparative Example 1 will be described below.

The first driving electrodes 3 were used as scan-signal electrode lines (S1–S3), and the control electrodes 14 were used as data-signal electrode lines (D11–D13). The second driving electrodes 4 were used as common electrodes and fixedly maintained at the ground potential.

Figure 25A:
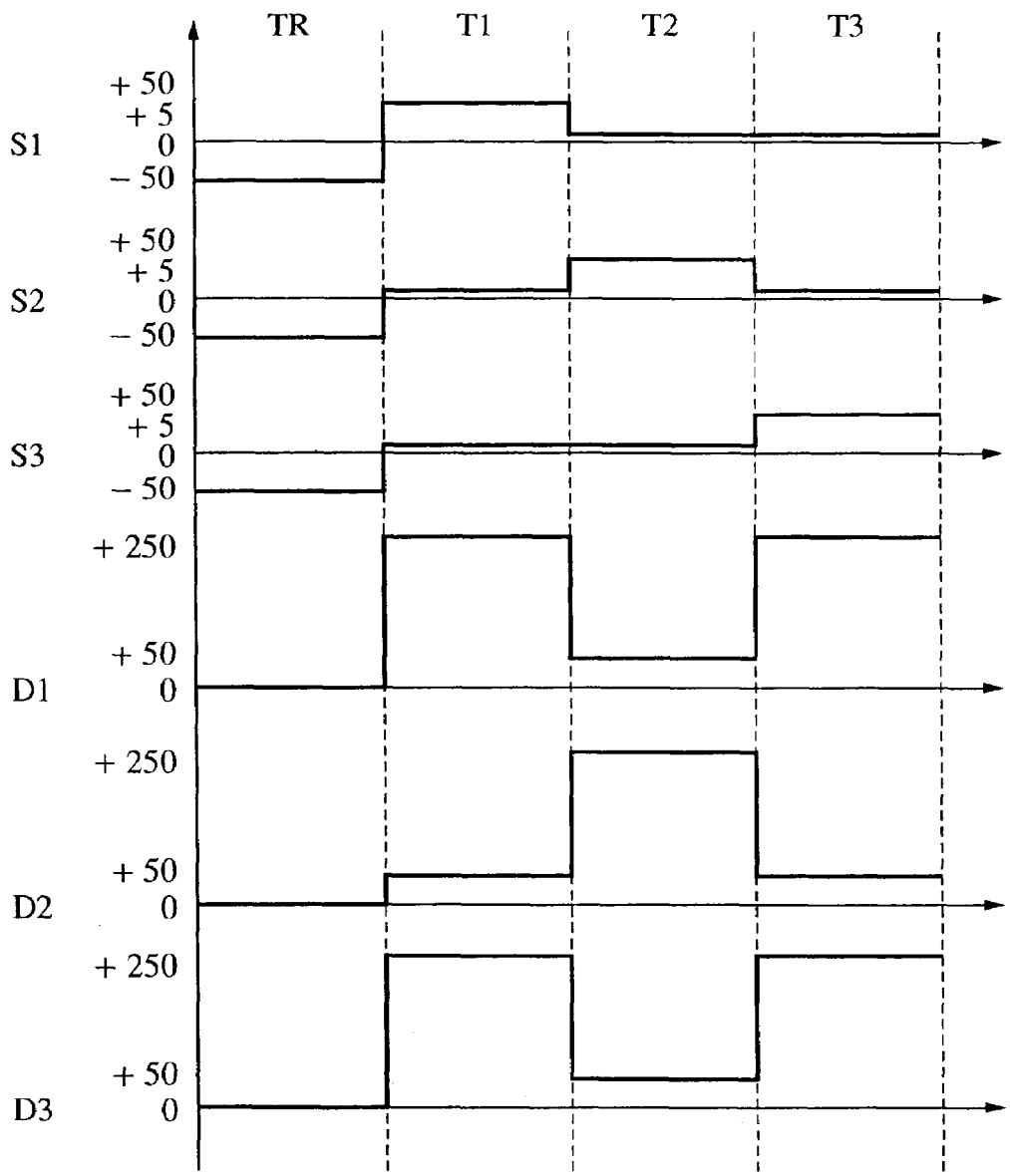
FIGS. 25A and 25B show respectively a time chart and a display pattern for matrix addressing performed in the Comparative Example.
Figure 25B:
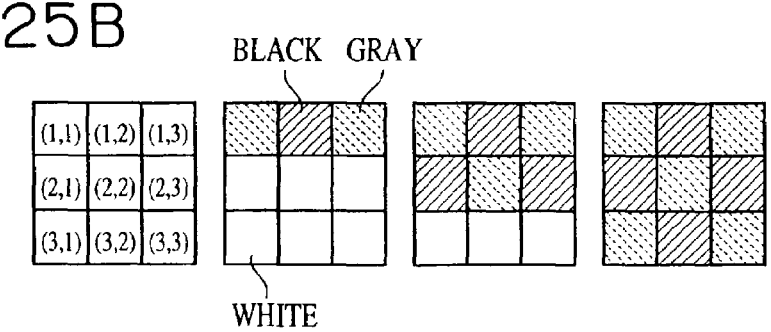

FIG. 25A is a time chart of driving pulses applied to the scan-signal electrode lines and the data-signal electrode lines, and FIG. 25B shows a change of the display condition in each time period. In FIGS. 25A and 25B, each time period is set to 50 msec.

The addressing operation of the cell was started by initially resetting an overall screen to a white view. Then, in each of the scan-signal electrode lines, writing was performed in one direction (i.e., from a white to a black view) for selected pixels (1,2), (2,1) (2,3) and (3,2) corresponding to a set display pattern. Note that writing of information was performed in this Comparative Example 1 in accordance with the addressing method described above with reference to FIGS. 18 to 21. The detailed behavior of the migratory particles in the write operation is similar to that in the explanation of the addressing method described above with reference to FIGS. 18 to 21, and therefore is not described herein.

The addressing method will now be described in sequence following the time chart of FIG. 25A. In a time period TR, Vd=−50 V was applied to all of the scan-signal electrode lines S1 to S3, and Vc=0 V was applied to all of the data-signal electrode lines D1–D3, thereby resetting all the pixels to provide a white view.

Figure 22A:
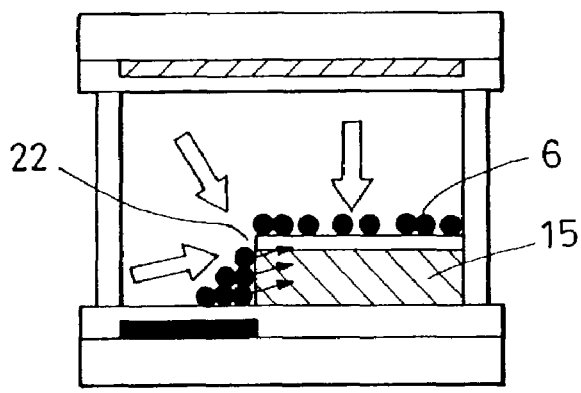
FIGS. 22A, 22B and 22C are schematic views for explaining problems with the one conventional display device.
Figure 22B:
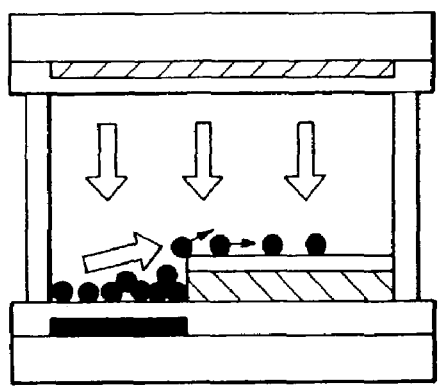
Figure 22C:
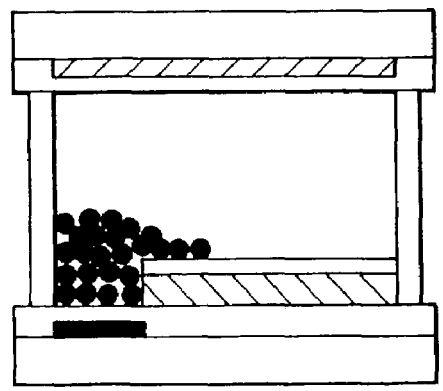
Figure 23A:
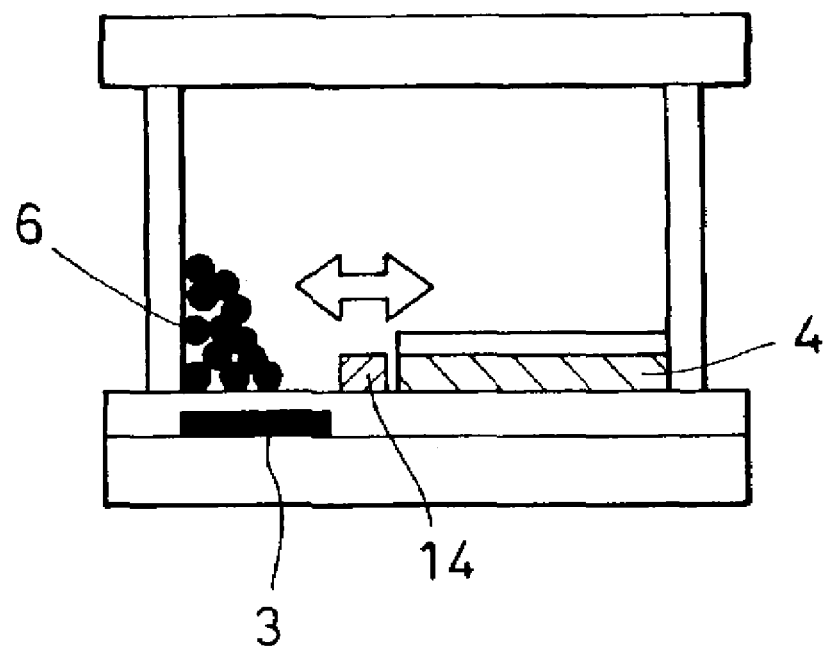
Figure 23B:
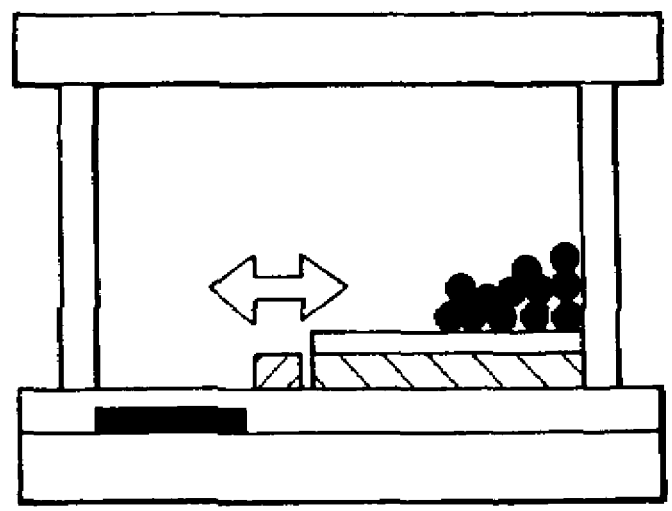

Then, in a time period T1, Vd=+50 V was applied to the scan-signal electrode line S1, which is selected at that time (i.e., a selected line), and Vd=+5 V was applied to the scan-signal electrode lines S2, S3, which are not selected at that time (i.e., non-selected lines). At the same time, the control voltage Vc=+50 V was applied to the data-signal electrode line D2 corresponding to the selected pixel (1,2), and Vc=+250 V was applied to the data-signal electrode lines D1, D3 corresponding to the non-selected pixels (1,1), (1,3). As a result, only the selected pixel (1,2) in the selected scan-signal electrode line S1 was rewritten to provide a black view, while a white view was maintained in the non-selected pixels (1,1), (1,3) in the selected scan-signal electrode line S1 and each of the pixels in the non-selected scan-signal electrode lines S2, S3. In the non-selected pixels (1,1) and (1,3), however, the migratory particles were not sufficiently held down even under Vc=+250 V and part of the migratory particles was migrated to the side of the second driving electrode as shown in FIG. 22C. Hence, the non-selected pixels (1,1) and (1,3) presented not a white view, but a gray view as shown in FIG. 25B.

Subsequently, the addressing was successively performed in time periods T2 and T3 in a similar manner according to a selected pixel pattern. As a result, an objective display pattern was obtained, but a white view was entirely grayish and the display contrast was poor. An average contrast ratio of white view to black view was about 3:1.

Example 2

In this Example 2, the (3×3)-matrix display cell employed in above Example 1 was operated in accordance with the above-described Passive Matrix Addressing Method 2 to implement the passive matrix addressing based on bi-directional writing.

A display cell used in this Example has exactly the same construction as that used in above Example 1 (plan view being shown in FIG. 14), and therefore an explanation of the manufacturing process is omitted herein.

The addressing method in this Example will be described below.

As with above Example 1, the first driving electrodes 3 were used as first data-signal electrode lines (D11–D13), the second driving electrodes 4 were used as second data-signal electrode lines (D21–D23), and the third driving electrodes 5 were used as scan-signal electrode lines (S1–S3).

Figure 16A:
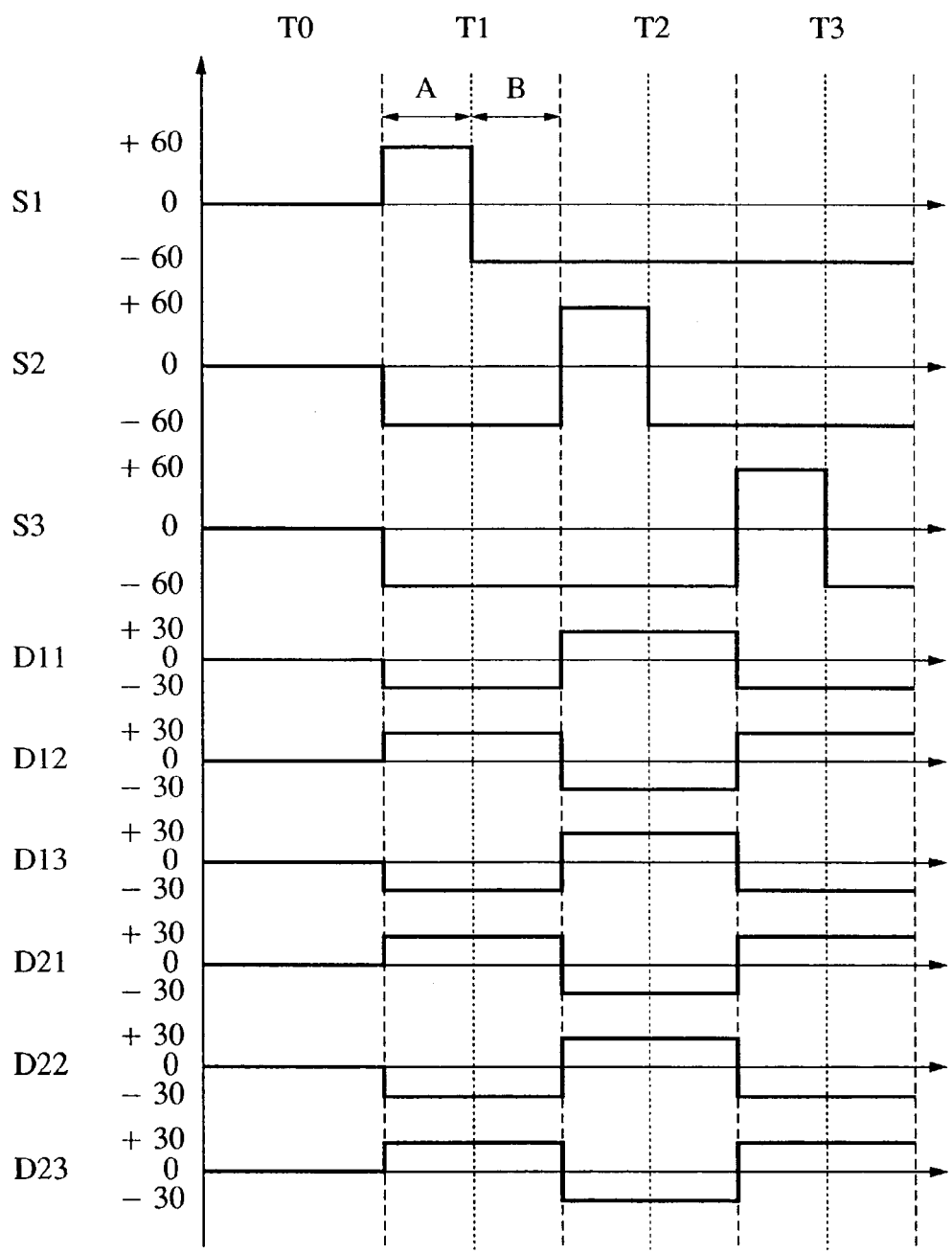
FIGS. 16A and 16B show respectively a time chart and a display pattern for matrix addressing performed in Example 2 of the present invention.
Figure 16B:
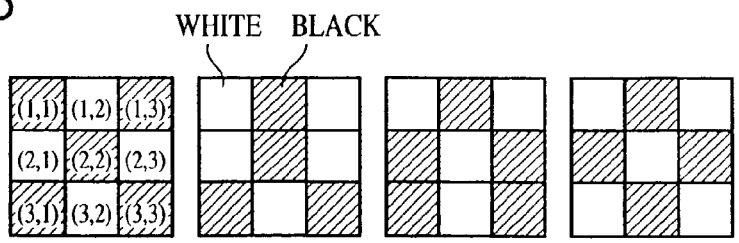

FIG. 16A is a time chart of driving voltages applied to the first and second data-signal electrode lines and the scan-signal electrode lines, and FIG. 16B shows a change of the display condition in each time period. In FIGS. 16A and 16B, each time period (T1, T2 or T3) is set to 60 msec. Further, a time period A represents a period in which the migratory particles are moved away from the third driving electrode and migrated onto the first or second driving electrode, and is set to 30 msec. A time period B represents a period in which a display pattern is transferred onto the third driving electrode, and is set to 30 msec.

As with above Example 1, since the bi-directional writing is possible, an initial operation to perform total reset is not required in this Example. Also, it is assumed that a pattern shown in a time period T0 is given as an initial display pattern, and all pixels are reversed in display condition, i.e., color in view, for each of the scan-signal electrode lines (S1–S3). Note that writing of information was performed in this Example in accordance with the Passive Matrix Addressing Method 2 described above with reference to FIGS. 8 and 9. The detailed behavior of the migratory particles in the write operation is similar to that in the explanation of the Passive Matrix Addressing Method 2 and therefore is not described herein.

The addressing method will now be described in sequence following the time chart of FIG. 16A. In the time period T1, the driving voltages were applied to the respective lines in two stages. In the first-half time period A, Vd3=+60 V was applied to the selected scan-signal electrode line S1, and Vd3=−60 V was applied to the non-selected scan-signal electrode lines S2, S3. At the same time, as white-view writing voltages, Vd1=−30 V was applied to the first data-signal electrode lines D11, D13 corresponding to the pixels (1,1) and (1,3), and Vd2=+30 V was applied to the second data-signal electrode lines D21, D23 corresponding to them. Also, as black-view writing voltages, Vd1=+30 V was applied to the first data-signal electrode line D12 corresponding to the pixel (1,2), and Vd2=−30 V was applied to the second data-signal electrode line D22 corresponding to the same. As a result, all pixels in the selected scan-signal electrode line S1 were rewritten and reversed in display condition. Then, in the latter-half time period B, Vd3=−60 V was applied to the selected scan-signal electrode line S1 for transferring the rewritten display pattern onto the third driving electrode 5. During the time period T1, each of the pixels in the non-selected scan-signal electrode lines S2, S3 was maintained in the initial display condition.

Subsequently, the addressing was successively performed in the time periods T2 and T3 in a similar manner according to a selected pixel pattern. As a result, an objective reversed display pattern was obtained with a high contrast, and the objective pattern was displayed in a shorter time than required in above Example 1. A deterioration of contrast due to crosstalk and failures in the migration and holding of the migratory particles was not observed in the obtained display. An average contrast ratio of white view to black view was as high as about 10:1.

Example 3

In this Example 3, a (3×3)-matrix display cell having the cell construction shown in FIG. 10, wherein the barriers 12 were provided on the surfaces of the third driving electrodes 5 arranged on the underside of the second substrate 2, was fabricated and operated with the passive matrix addressing based on bi-directional writing.

A plan view of the (3×3)-matrix display cell thus fabricated was the same as that shown in FIG. 14. As with above Example 1, the size of one pixel was 1 mm×1 mm, and the area ratio of the first driving electrode 3 to the second driving electrode 4 was 20:80.

A method of manufacturing the cell will be briefly described below with reference to FIGS. 10 and 14.

First, an insulating layer 8 made of an acrylic resin containing a white pigment, such as alumina, dispersed therein was formed on an overall surface of a first substrate 1 formed of a PET film having a thickness of 200 μm. Then, an ITO film was formed as a second driving electrode 4 on the insulating layer 8 at a low temperature and patterned into a shape as shown through the steps of photolithography and dry etching. Then, a deep-black titanium carbide film was formed as a first driving electrode 3 on the insulating layer 8 and patterned in a similar manner. Then, another insulating layer 8 made of an amorphous fluorocarbon resin was formed in a thickness of 200 nm on the overall surface. Partitions 10 were formed on this insulating layer 8. The partitions 10 were formed in a height of 70 μm by coating a photosensitive epoxy resin and patterning the coated resin through the steps of exposure and wet development. A dielectric liquid 7 and black charged migratory particles 6 were filled in each space surrounded by the formed partitions 10.

Subsequently, an ITO film was formed as a third driving electrode 5 on a second substrate 2 formed of a PET film at a low temperature and patterned into a shape as shown. An insulating layer 9 made of an amorphous fluorocarbon resin was then formed in a thickness of 200 nm on the overall surface. Barriers 12 were then formed in a thickness of 30 μm on the insulating layer 9 through the steps of coating, exposing and developing a photosensitive epoxy resin.

The subsequent process is exactly the same as those described above in Example 1, and hence a description thereof is omitted herein.

Matrix addressing was performed exactly in the same manner as that in Example 1. As a result, an objective display pattern was obtained with a higher contrast because of the presence of the barriers 12. Further, the driving voltage applied for transferring the display pattern onto the third driving electrode could be reduced to Vd3=−45 V. A deterioration of contrast due to crosstalk and failures in the migration and holding of the migratory particles was not observed in the obtained display. An average contrast ratio of white view to black view was as high as about 15:1.

Example 4

In this Example 4, a (3×3)-matrix display cell having the cell construction shown in FIG. 11, wherein the charged film 13 was formed on the surfaces of the third driving electrodes 5 arranged on the underside of the second substrate 2, was fabricated and operated with the passive matrix addressing based on bi-directional writing.

A plan view of the (3×3)-matrix display cell thus fabricated was the same as that shown in FIG. 14. As with above Example 1, the size of one pixel was 1 mm×1 mm, and the area ratio of the first driving electrode 3 to the second driving electrode 4 was 20:80.

A method of manufacturing the cell will be briefly described below with reference to FIGS. 11 and 14.

First, an insulating layer 8 made of an acrylic resin containing a white pigment, such as alumina, dispersed therein was formed on an overall surface of a first substrate 1 formed of a PET film having a thickness of 200 μm. Then, an ITO film was formed as a second driving electrode 4 on the insulating layer 8 at a low temperature and patterned into a shape as shown through the steps of photolithography and dry etching. Then, a deep-black titanium carbide film was formed as a first driving electrode 3 on the insulating layer 8 and patterned in a similar manner. Then, another insulating layer 8 made of an amorphous fluorocarbon resin was formed in a thickness of 200 nm on the overall surface. Partitions 10 were formed on this insulating layer 8. The partitions 10 were formed in a height of 70 μm by coating a photosensitive epoxy resin and patterning the coated resin through the steps of exposure and wet development. A dielectric liquid 7 and black charged migratory particles 6 were filled in each space surrounded by the formed partitions 10.

Subsequently, an ITO film was formed as a third driving electrode 5 on a second substrate 2 formed of a PET film at a low temperature and patterned into a shape as shown. An insulating layer 9 made of an amorphous fluorocarbon resin was then formed in a thickness of 200 nm on the overall surface.

The charged film 13 was then formed. Teflon-FEP was used as a material of the charged film 13, and was treated to have an electret property with a corona discharge under heating at a high temperature. More specifically, the insulating layer 9 was etched by Ar gas for five minutes, whereby the layer surface was roughed to increase adhesion of the charged film onto it. After laying a transparent Teflon-FEP sheet having a thickness of 5 μm on the roughed surface, the sheet was heated and fused at 300° C. while a weight was imposed on the sheet through a glass plate. Then, by cooling the sheet, a Teflon-FEP film was formed in a thickness of 5 μm on the third driving electrode 5. For treatment to give the Teflon-FEP sheet an electret property, a knife edge electrode attached to an XYZ displacement mechanism and the second substrate, including the Teflon-FEP film and the electrode films formed thereon, were both placed in a thermostatic chamber. The knife edge electrode was arranged to face a surface of the Teflon-FEP film through a gap, and the distance (gap) between the knife edge electrode and the Teflon-FEP film was adjusted to 200 μm. While maintaining an inner space of the thermostatic chamber at 300° C., a voltage of 5 kV was applied between the electrode films and the knife edge electrode in such a direction that the knife edge electrode was on the negative side, thereby generating a corona discharge between the electrode films and the knife edge electrode. The knife edge electrode was moved to reciprocate at a constant speed in a horizontal direction parallel to the substrate surface by the XYZ displacement mechanism supporting the knife edge electrode. The overall substrate surface was thereby subjected to uniform irradiation of the corona discharge. The treatment to give the Teflon-FEP sheet an electret property was completed by rapidly cooling the irradiated substrate surface by dry nitrogen. The charged film thus obtained was transparent and a measured surface potential of the charged film was −20 V.

The subsequent process is exactly the same as those described above in Example 1, and hence a description thereof is omitted herein.

Matrix addressing was performed exactly in the same manner as that in Example 1. As a result, an objective display pattern was achieved in an addressing time comparable to that in Example 1. In other words, it was confirmed that the addressing characteristics were hardly affected by attraction of the migratory particles by the charged film 13. Further, the objective display pattern was obtained with a higher contrast because of the presence of the charged film 13. In addition, the driving voltage applied for transferring the display pattern onto the third driving electrode could be reduced to Vd3=−40 V. A deterioration of contrast due to crosstalk and failures in the migration and holding of the migratory particles was not observed in the obtained display. An average contrast ratio of white view to black view was as high as about 13:1.

Example 5

In this Example 5, a cell having the construction shown in FIG. 3 was fabricated and operated to provide color display by forming red, green and blue pixels on the first substrate 1 in a combined arrangement. The size of one pixel was 1 mm×1 mm, and the area ratio of the first driving electrode 3 to the second driving electrode 4 was 20:80.

A method of manufacturing a red cell will be briefly described below with reference to FIG. 3A.

First, a colored insulating layer 11 made of an acrylic resin containing a red pigment dispersed therein was formed on a first substrate 1 formed of a PET film having a thickness of 200 μm. Then, a deep-black titanium carbide film was formed as a first driving electrode 3 on the insulating layer 11 and patterned into a shape as shown through the steps of photolithography and dry etching.

Then, an amorphous fluorocarbon resin was coated in a thickness of 100 nm, and in succession an ITO thin film was formed as a second driving electrode 4 at a low temperature by magnetron sputtering. Subsequently, a resist film was coated and patterned into a shape as shown. Finally, the first substrate 1 was subjected to reactive dry etching using $CF_4$ and $O_2$ gases, whereby the second driving electrode 4 of ITO was formed. Thereafter, an insulating layer 8 made of an amorphous fluorocarbon resin was formed in a thickness of 200 nm on the overall surface.

The subsequent process is exactly the same as those described above in Example 1, and hence a description thereof is omitted herein.

The red cell thus fabricated was operated to provide display in accordance with the method described above in connection with FIGS. 4 and 5. First, the driving voltage Vd1=−30 V was applied to the first driving electrode 3 and the driving voltage Vd2=+30 V was applied to the second driving electrode 4 for migrating the migratory particles 6 so as to position on the side of the first driving electrode 3. Then, the driving voltage Vd3=−60 V was applied to the third driving electrode 5, causing the migratory particles 6 to be attracted onto the third driving electrode 5 by electrostatic forces. At this time, when looking at the cell from the second substrate side, the cell presented a red view because the red colored insulating layer 11 formed under the transparent second driving electrode 4 was observed by the viewer.

Subsequently, the display condition was rewritten in accordance with the Passive Matrix Addressing Method 1. The driving voltages Vd1=Vd2=0 V were applied to the first and second driving electrodes 3, 4 and the driving voltage Vd3=+60 V was applied to the third driving electrode 5, whereby the migratory particles 6 were migrated away from the second substrate 2 toward the first substrate side. Thereafter, the driving voltage Vd1=+30 V was applied to the first driving electrode 3 and the driving voltage Vd2=−30 V was applied to the second driving electrode 4 for migrating the migratory particles 6 so as to position on the side of the second driving electrode 4. Then, the driving voltage Vd3=−60 V was applied again to the third driving electrode 5, causing the migratory particles 6 to be transferred onto the second substrate side. At this time, the cell presented a black view because the black migratory particles 6 and the deep-black first driving electrode 3 were observed from the second substrate side. The display condition could be rewritten in a time of not longer than 50 msec.

Successively, the display condition was rewritten in accordance with the Passive Matrix Addressing Method 2. The driving voltage Vd3=+60 V was applied to the third driving electrode 5 for migrating the migratory particles 6 away from the second substrate 2 toward the first substrate side. Simultaneously, the driving voltage Vd1=−30 V was applied to the first driving electrode 3 and the driving voltage Vd2=+30 V was applied to the second driving electrode 4 for migrating the migratory particles 6 so as to position on the side of the first driving electrode 3. Then, the driving voltage Vd3=−60 V was applied to the third driving electrode 5, causing the migratory particles 6 to be transferred onto the second substrate side. At this time, the cell presented a red view because the red colored insulating layer 11 formed under the transparent second driving electrode 4 was observed from the second substrate side. The display condition could be rewritten in a time of not longer than 30 msec, and the rewrite speed was increased in comparison with the case of using the Passive Matrix Addressing Method 1.

A green cell was fabricated through the same process as for the red cell except for forming, on a first substrate 1 formed of a PET film, a colored insulating layer 11 made of an acrylic resin containing a green pigment dispersed therein. The green cell thus fabricated was operated to provide display in accordance with the same method as for the red cell. As a result, the green cell was able to present a green view as intended.

A blue cell was also fabricated through the same process as for the red cell except for forming, on a first substrate 1 formed of a PET film, a colored insulating layer 11 made of an acrylic resin containing a blue pigment dispersed therein. The blue cell thus fabricated was operated to provide display in accordance with the same method as for the red cell. As a result, the blue cell was able to present a blue view as intended.

Three types of cells representing red, green and blue pixels were fabricated in a combined arrangement by forming the colored insulating layer 11 in three colors of red, green and blue. As a result, color display was obtained by those cells. In other words, color display could be realized by fabricating three cells each having the construction of FIG. 3A to provide red, green and blue pixels, and arranging those three pixels adjacent to each other so as to provide one composite pixel.

As described above in detail, the present invention can provide the following advantages.

First, in the selected line, the migratory particles forming a display pattern are attracted onto the third driving electrode, and are kept away from the first and second driving electrodes. Therefore, even when the driving voltages applied to the first and second driving electrodes are changed, the migratory particles are less affected by the change of an electric field, and the display pattern is avoided from changing due to the unintended migration of the migratory particles. It is thus possible to surely inhibit the unintended migration of the migratory particles and hold them in a desired position under a lower voltage.

Secondly, in an electrophoretic display device of the horizontally migrating type, passive matrix addressing is realized with a high display contrast without causing any crosstalk. The reason is that the novel addressing method has succeeded in substantially perfectly eliminating the occurrence of crosstalk, which has been experienced in the conventional device due to a failure in holding the migratory particles properly in the non-selected pixels.

Thirdly, bi-directional writing is enabled in the present invention. Therefore, initial total reset is no longer required, and partial rewriting to rewrite only part of a display screen is realized.

Fourthly, by forming the barriers or the charged film, the driving voltage can be further reduced which is required for inhibiting the migration of the migratory particles and holding them at a standstill in a state where the display pattern is transferred onto the third driving electrode. In addition, the contrast is improved.

Fifthly, color display can be realized.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electrophoretic display device comprising:
   a first substrate;
   a pair of first and second individually driven driving electrodes arranged on said first substrate and forming part of a same pixel;
   a second substrate arranged in an opposing relation to said first substrate;
   a third driving electrode arranged on said second substrate;
   a transparent dielectric liquid filled between said first substrate and said second substrate;
   a plurality of migratory particles dispersed in said transparent dielectric liquid; and
   a barrier disposed on a surface of said third driving electrode arranged on said second substrate, said barrier being situated in an opposing relation to a boundary between said first driving electrode and said second driving electrode.

2. An electrophoretic display device according to claim 1, further comprising insulating layers arranged to cover said first driving electrode, said second driving electrode, and said third driving electrode.

3. An electrophoretic display device according to claim 2, wherein at least one of said first driving electrode, said second driving electrode, said third driving electrode, said first substrate, said second substrate, and said insulating layers are colored to have different optical characteristics from those of the migratory particles.

4. An electrophoretic display device according to claim 1, wherein said first substrate and said second substrate are each formed of a polymer film.

5. An electrophoretic display device according to claim 1, wherein an average diameter of the migratory particles is in the range of 0.1 µm to 10 µm.

6. An electrophoretic display device according to claim 1, wherein the distance between said first substrate and said second substrate is not larger than 500 µm.

7. An electrophoretic display device according to claim 1, wherein the distance between said first substrate and said second substrate is not larger than 100 µm.

8. An electrophoretic display device according to claim 1, wherein the distance between said first substrate and said second substrate is not smaller than the diameter of the migratory particles.

9. An electrophoretic display device according to claim 1, wherein the distance between said first substrate and said second substrate is not smaller than twice the diameter of the migratory particles.

10. An electrophoretic display device according to claim 1, wherein the distance between said first substrate and said second substrate is not smaller than five times the diameter of the migratory particles.

11. An electrophoretic display device according to claim 1, wherein said first substrate and the migratory particles are black or deep black in color.

12. An electrophoretic display device according to claim 11, wherein the distance between said first substrate and said second substrate is not smaller than five times the diameter of the migratory particles.

13. An electrophoretic display device according to claim 1, further comprising a plurality of first and second individually driven driving electrodes, arranged on said first substrate, and a plurality of said barriers, each said barrier disposed in an opposing relation to a boundary between one of said plurality of first and second driving electrodes.

14. An electrophoretic display device including a plurality of pixels, comprising:
 a first substrate;
 first and second driving electrodes arranged on said first substrate and forming part of a same pixel;
 a second substrate arranged in an opposing relation to said first substrate;
 a third driving electrode arranged on said second substrate;
 a transparent dielectric liquid filled between said first substrate and said second substrate;
 a plurality of migratory particles dispersed in said transparent dielectric liquid; and
 a barrier disposed on a surface of said third driving electrode arranged on said second substrate, said barrier being situated in an opposing relation to a boundary between said first driving electrode and said second driving electrode.

15. An electrophoretic display device according to claim 14, further comprising insulating layers arranged to cover said first driving electrode, said second driving electrode, and said third driving electrode.

16. An electrophoretic display device according to claim 15, wherein at least one of said first driving electrode, said second driving electrode, said third driving electrode, said first substrate, said second substrate, and said insulating layers are colored to have different optical characteristics from those of the migratory particles.

17. An electrophoretic display device according to claim 14, wherein said first substrate and said second substrate are each formed of a polymer film.

18. An electrophoretic display device according to claim 14, wherein the distance between said first substrate and said second substrate is not larger than 500 µm.

19. An electrophoretic display device according to claim 14, wherein the distance between said first substrate and said second substrate is not larger than 100 µm.

20. An electrophoretic display device according to claim 14, wherein the distance between said first substrate and said second substrate is not smaller than the diameter of the migratory particles.

21. An electrophoretic display device according to claim 14, wherein the distance between said first substrate and said second substrate is not smaller than twice the diameter of the migratory particles.

22. An electrophoretic display device according to claim 14, further comprising a plurality of first and second individually driven driving electrodes, arranged on said first substrate and forming part of the same pixel, and a plurality of said barriers, each said barrier disposed in an opposing relation to a boundary between one of said plurality of first and second driving electrodes.

* * * * *

UNITED STATES PATENT AND TRADEMARK OFFICE
CERTIFICATE OF CORRECTION

PATENT NO.         : 7,057,600 B2
APPLICATION NO. : 10/337884
DATED              : June 6, 2006
INVENTOR(S)       : Tatsuhito Goden It is certified that error appears in the above-identified patent and that said Letters Patent is hereby corrected as shown below:

On title page
Item [30] FOREIGN APPLICATION PRIORITY DATA:

"112115/2000" and "72663/2001" should read --2000-112115-- and --2001-72663--.

COLUMN 26:

Line 27, "position" should read --positions them--.
Line 63, "position" should read --positions them--.

COLUMN 29:

Line 11, "a" should read --the--.

Signed and Sealed this

Twentieth Day of November, 2007

JON W. DUDAS
*Director of the United States Patent and Trademark Office*